United States Patent
Hatada

(10) Patent No.: US 7,471,462 B2
(45) Date of Patent: Dec. 30, 2008

(54) ZOOM LENS AND IMAGE PICKUP APPARATUS HAVING THE SAME

(75) Inventor: Takahiro Hatada, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/938,993

(22) Filed: Nov. 13, 2007

(65) Prior Publication Data

US 2008/0112063 A1    May 15, 2008

(30) Foreign Application Priority Data

Nov. 14, 2006 (JP) ............... 2006-307838

(51) Int. Cl.
*G02B 15/14* (2006.01)
(52) U.S. Cl. .............. 359/690; 359/686; 359/676; 359/687
(58) Field of Classification Search ........ 359/686, 359/676, 690, 687
See application file for complete search history.

(56) References Cited

U.S. PATENT DOCUMENTS

| 4,331,389 | A | * | 5/1982 | Ogawa et al. | ............ 359/687 |
| 5,530,594 | A | | 6/1996 | Shibayama | |
| 5,715,088 | A | | 2/1998 | Suzuki | |
| 6,052,235 | A | | 4/2000 | Ozaki | |
| 6,061,180 | A | * | 5/2000 | Hayakawa | .......... 359/557 |
| 6,483,649 | B2 | * | 11/2002 | Ozaki | .......... 359/690 |
| 6,778,331 | B2 | | 8/2004 | Ozaki | |
| 7,123,422 | B2 | | 10/2006 | Suzuki | |
| 2001/0006433 | A1 | * | 7/2001 | Ozaki | .......... 359/690 |

FOREIGN PATENT DOCUMENTS

JP    2005-266183    9/2005

* cited by examiner

*Primary Examiner*—Ricky L Mack
*Assistant Examiner*—James R Greece
(74) *Attorney, Agent, or Firm*—Canon USA Inc IP Div

(57) ABSTRACT

A zoom lens includes, in order from the object side to the image side, a first lens unit having a positive refractive power, a second lens unit having a negative refractive power, and a third lens unit having a positive refractive power. The first lens unit and the third lens unit move in the optical axis direction during zooming. The following conditions are satisfied:

$$0.60 < m3/m1 < 0.90, \text{ and}$$

$$0.080 < |f2/ft| < 0.120,$$

where m1 and m3 are maximum moving distances in the optical axis direction of the first lens unit and the third lens unit, respectively, during zooming from the wide-angle end to the telephoto end, ft is a focal length of the zoom lens at the telephoto end, and f2 is a focal length of the second lens unit.

9 Claims, 29 Drawing Sheets

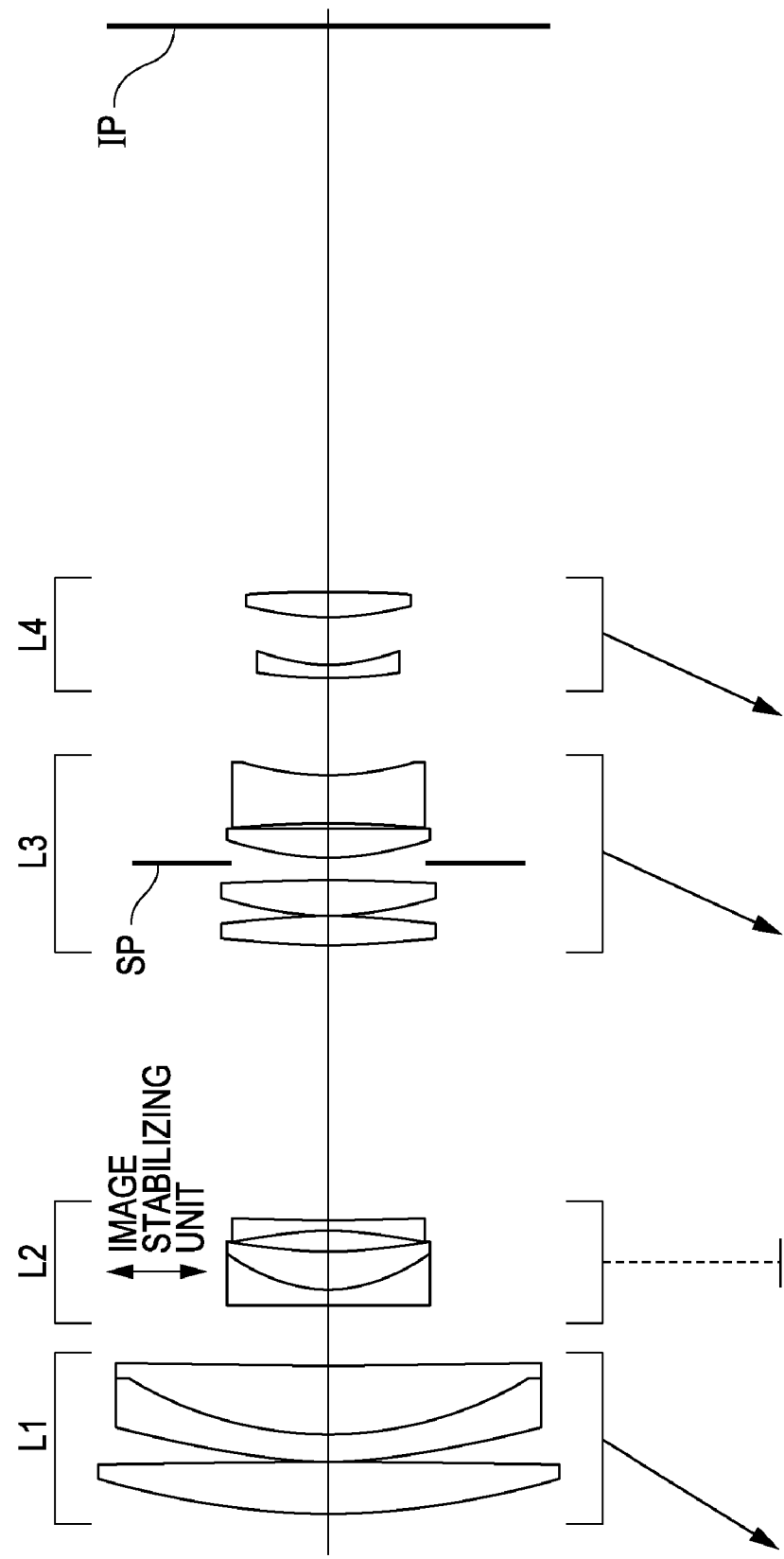

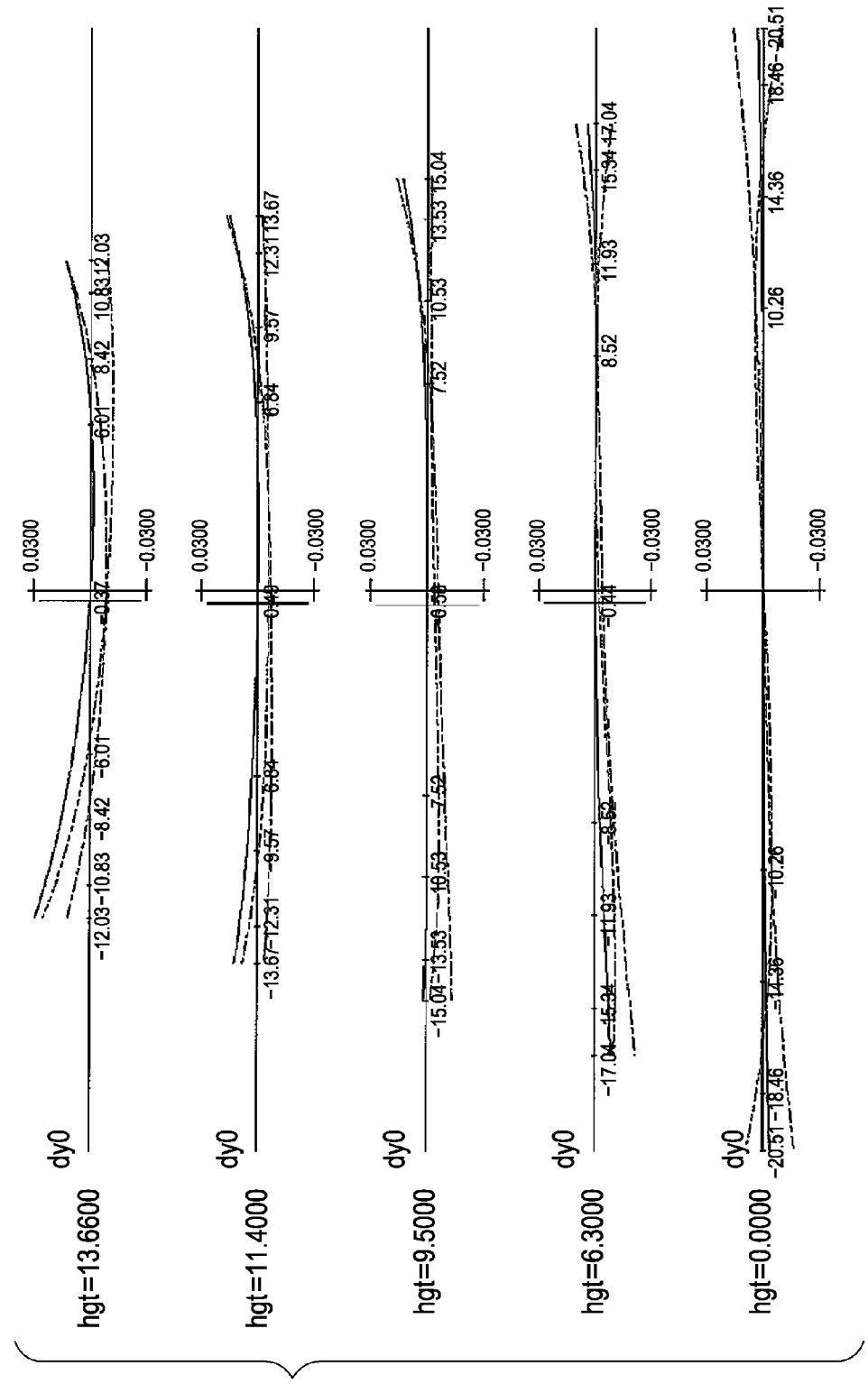

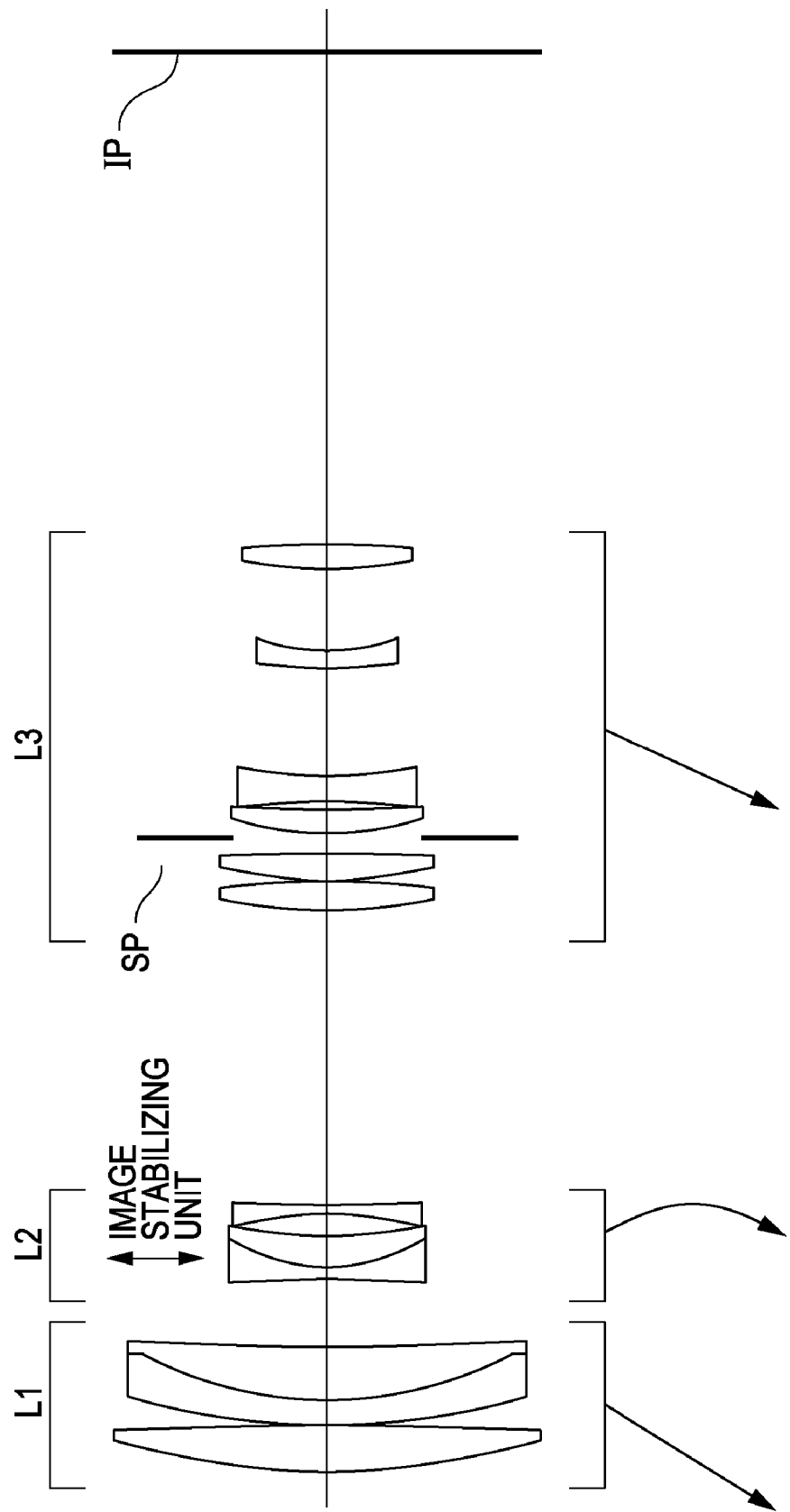

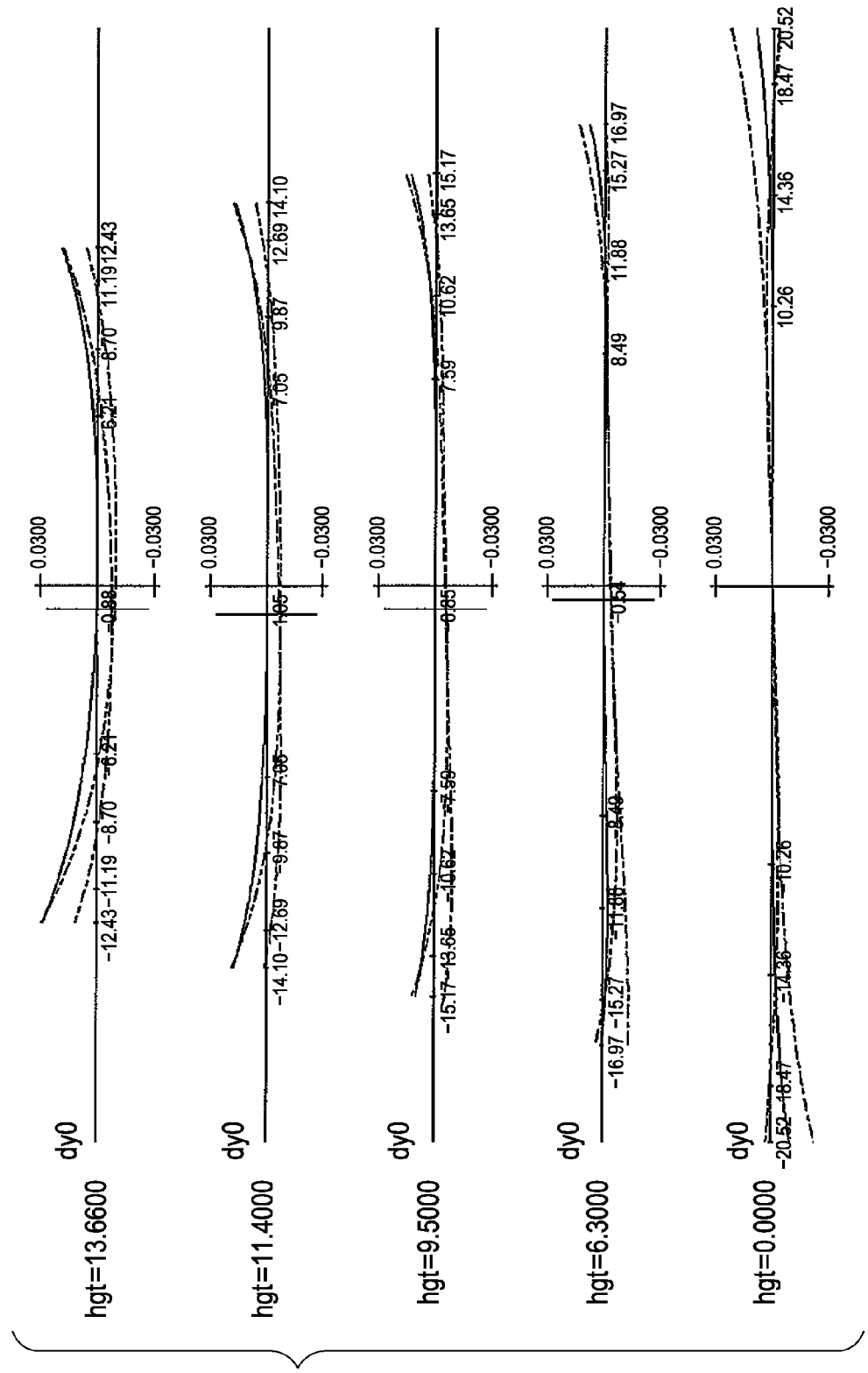

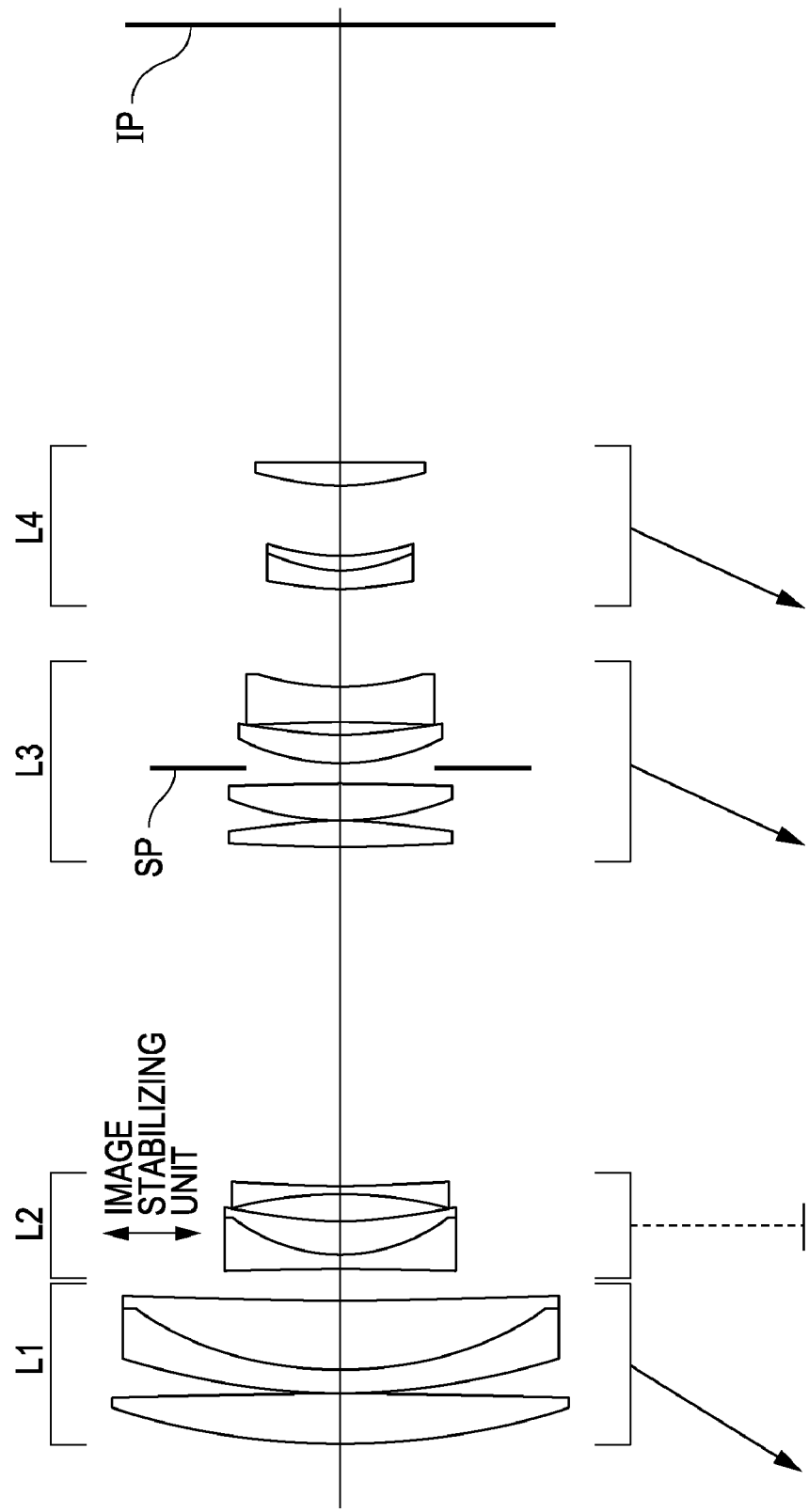

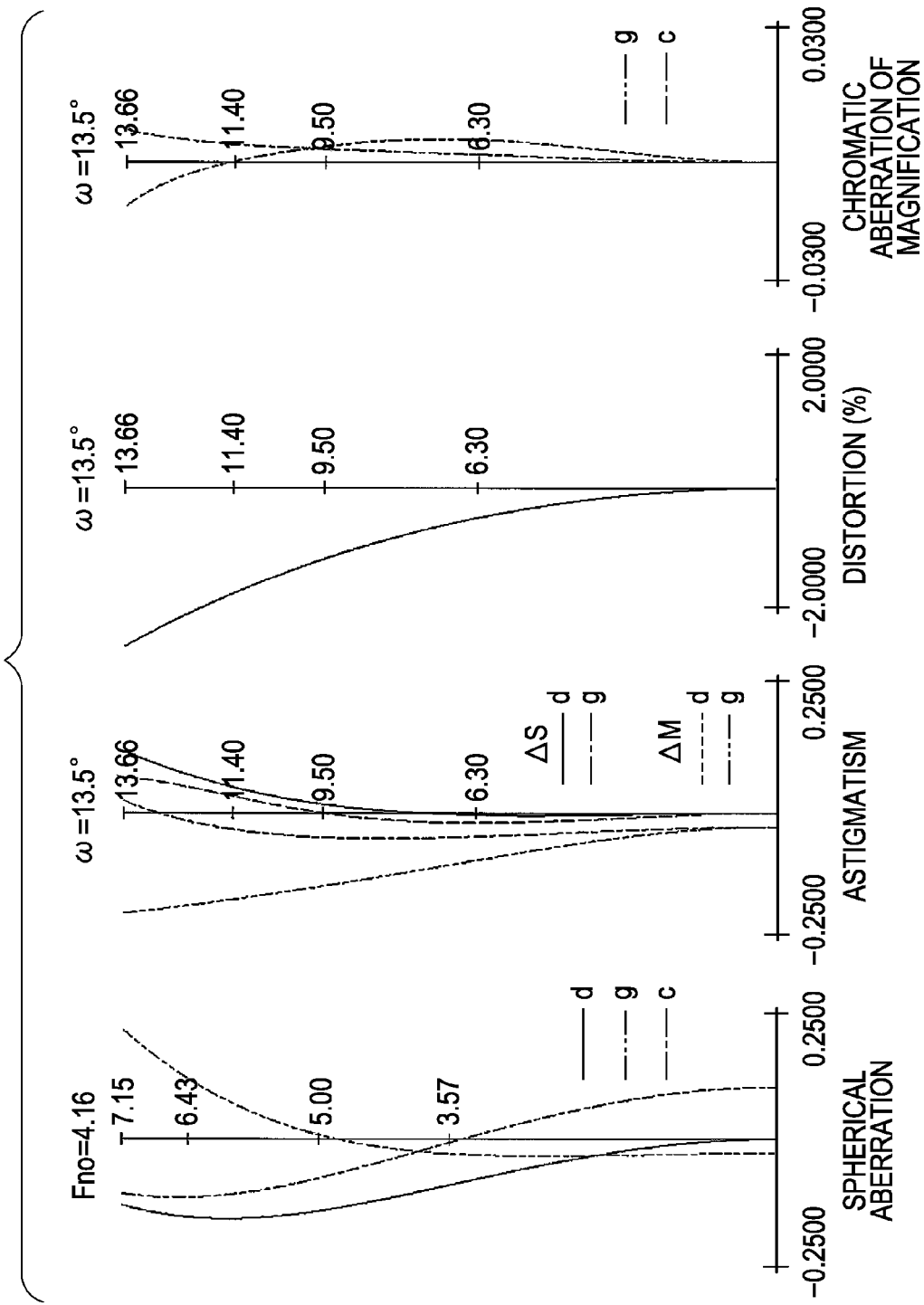

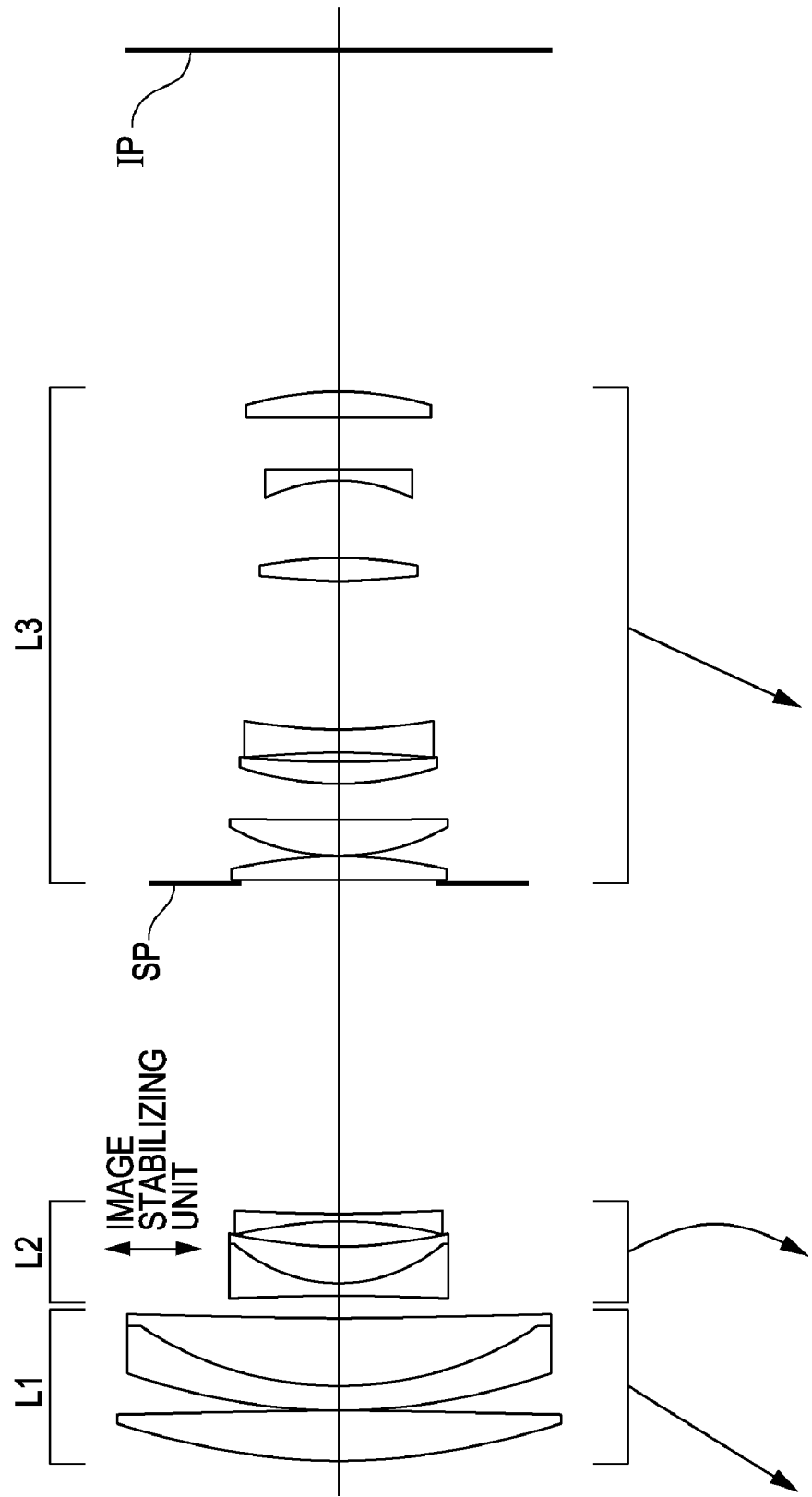

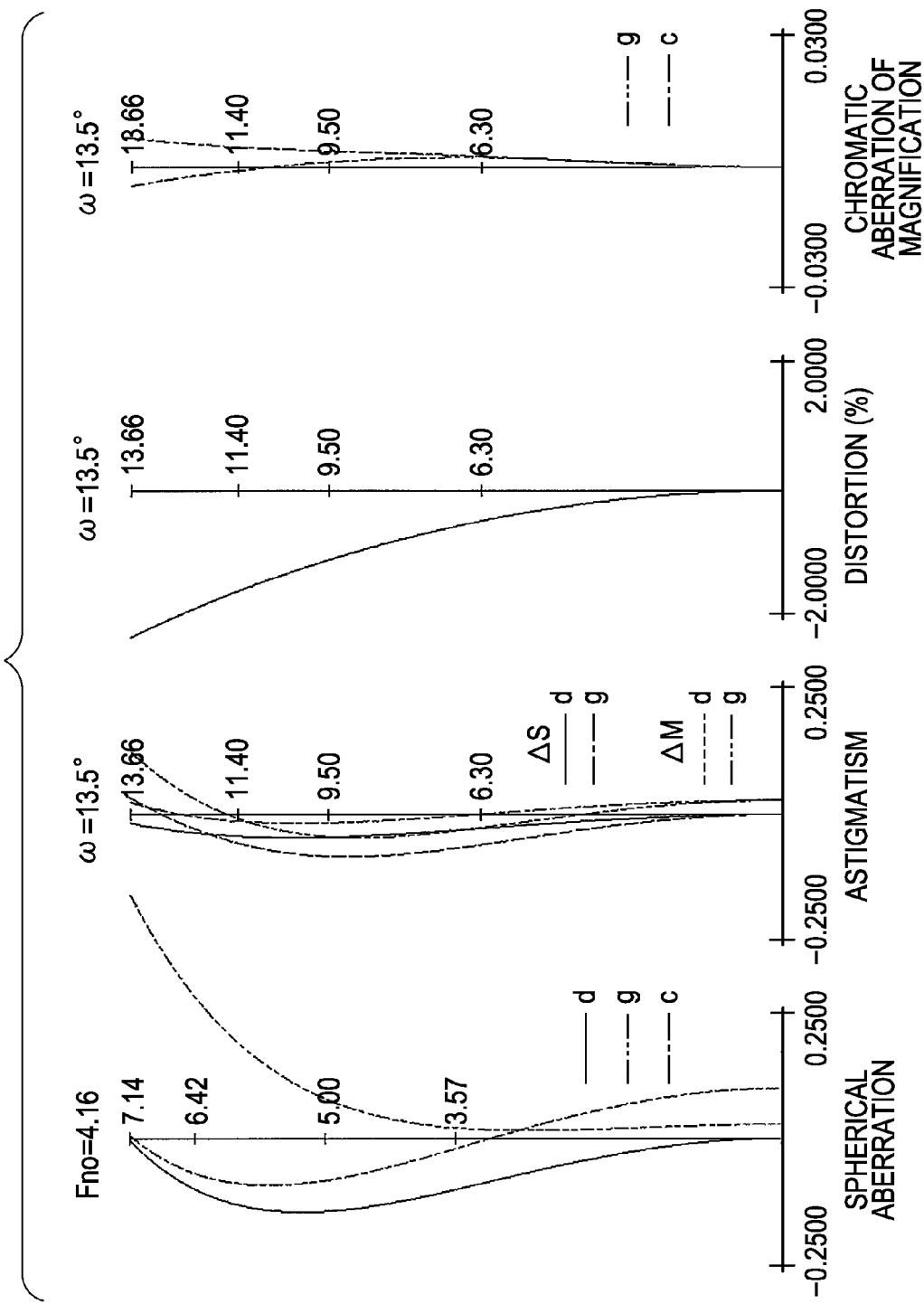

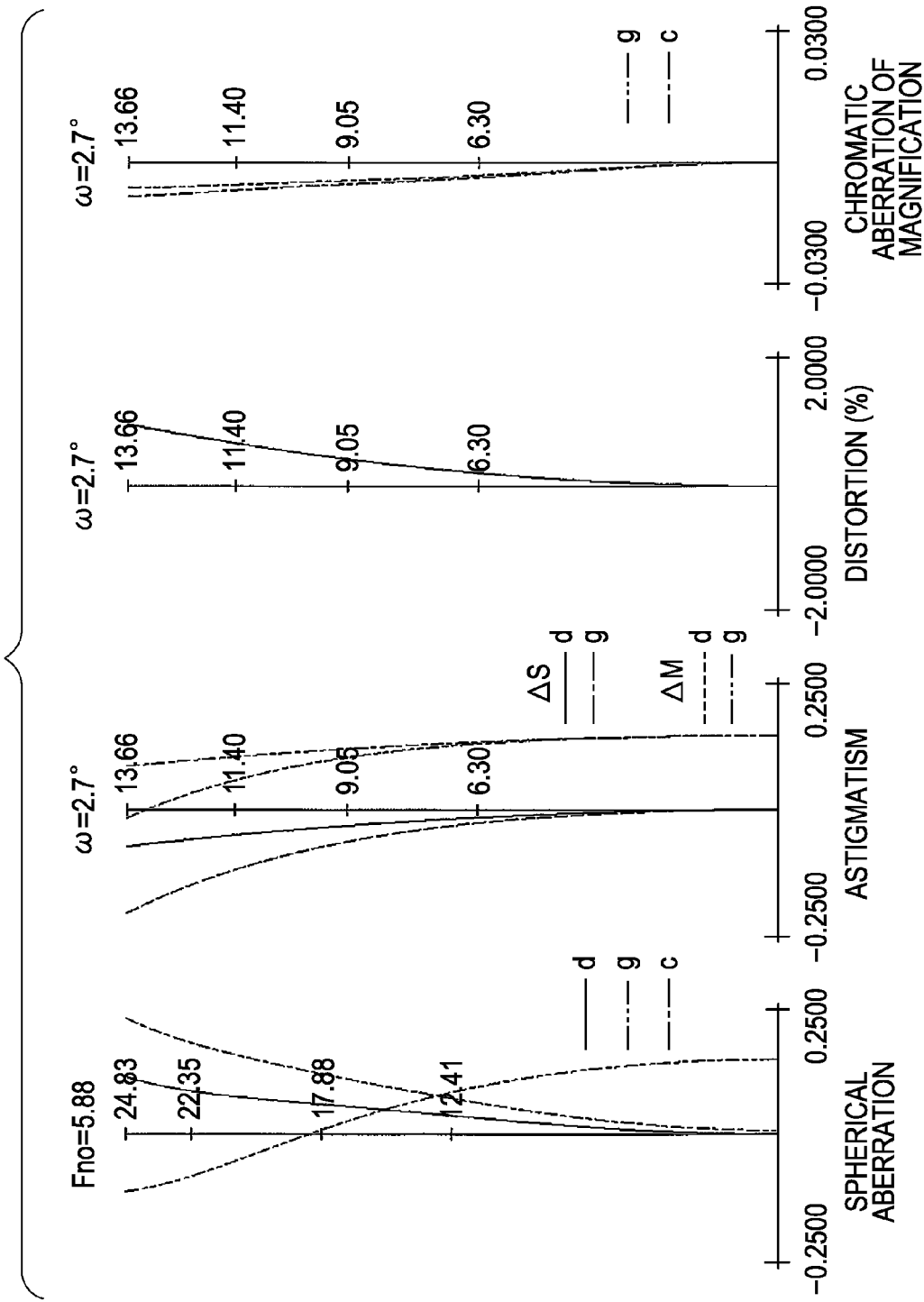

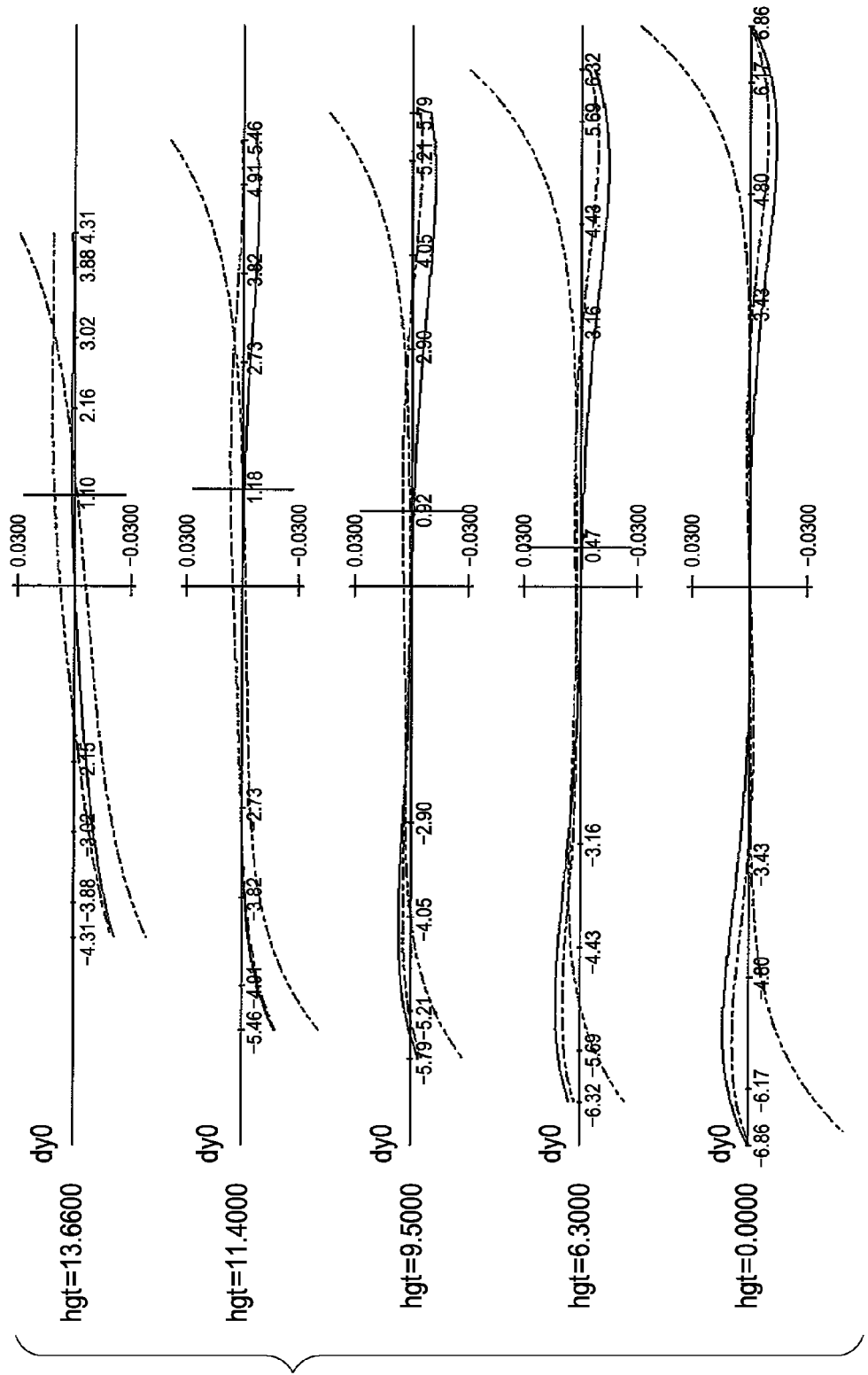

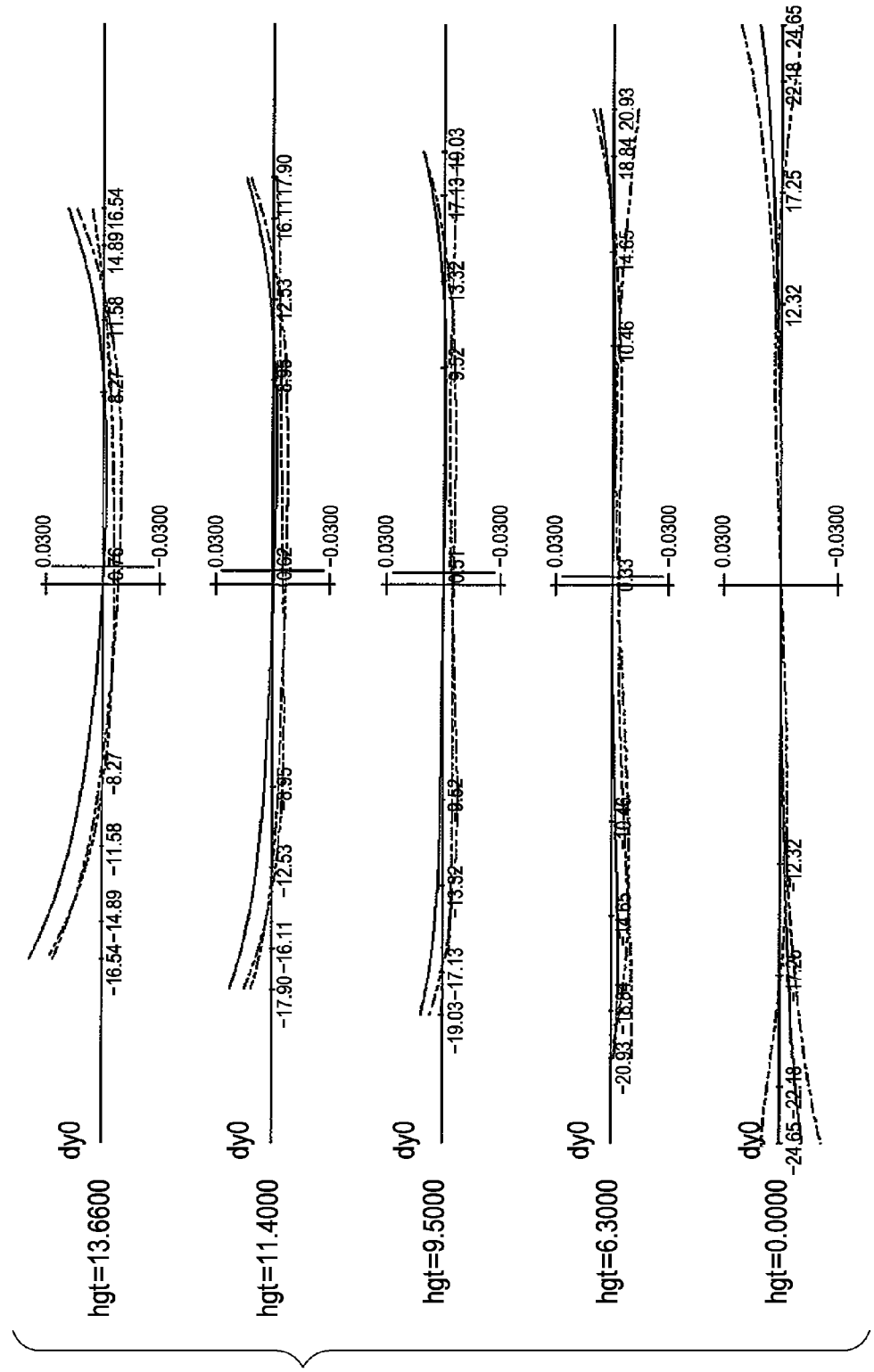

ZOOM LENS AND IMAGE PICKUP APPARATUS HAVING THE SAME

BACKGROUND OF THE INVENTION

1. Field of the Invention

The present invention relates to zoom lenses used in image pickup apparatuses such as single-lens reflex cameras, digital cameras, video cameras, and film cameras.

2. Description of the Related Art

Image pickup apparatuses such as film cameras, digital cameras, and video cameras require a zoom lens having a high zoom ratio and high optical performance.

A positive lead type zoom lens, in which the most object-side lens unit has a negative refractive power, is known as a zoom lens of high zoom ratio.

There is known a high-zoom-ratio telephoto-type three-unit or four-unit zoom lens in which three or more lens units are moved for zooming (U.S. Pat. Nos. 5,530,594, 6,052,235, 6,483,649, and 6,778,331, and Japanese Patent Laid-Open No. 2005-266183).

Many of telephoto type zoom lenses including a long focal length are large and heavy. Therefore, when a telephoto type zoom lens is used, it is difficult to photograph with the vibration of the zoom lens controlled.

Inclination of the zoom lens due to vibration causes a photographed image to be displaced (blurred) by an amount according to the inclination angle and the focal length at the zooming position. Some of telephoto type zoom lenses have image stabilizing performance to prevent blurring of a photographed image.

There is known as a zoom lens having image stabilizing performance. The zoom lens has, in order from the object side to the image side, first, second, and third lens units having positive, negative, and positive refractive powers, respectively. The whole second lens unit is vibrated in a direction perpendicular to the optical axis so as to obtain a still image (U.S. Pat. Nos. 5,715,088 and 7,123,422).

In general, in zoom lenses, increasing the refractive power of each lens unit reduces the moving distance of each lens unit for obtaining a predetermined zoom ratio, thereby facilitating achieving a high zoom ratio with the overall length of the lens reduced.

However, simply increasing the refractive power of each lens unit and reducing the moving distance of each lens unit increases the aberration fluctuation accompanying the zooming. Particularly in the case of a high zoom ratio, it is difficult to obtain excellent optical performance throughout the entire zoom range.

The zoom lenses described in the above references (U.S. Pat. Nos. 5,530,594, 6,052,235, 6,483,649, and 6,778,331, and Japanese Patent Laid-Open No. 2005-266183) consist of three or four units and have a comparatively small number of lenses, and the whole systems thereof are small. However, the zoom ratios of the zoom lenses are about four times and insufficient.

On the other hand, in a zoom lens having image stabilizing performance, an inappropriate lens configuration of image stabilizing lens units moved for image stabilization increases the amount of decentration aberration and decreases the optical performance under image stabilization.

Particularly in telephoto type zoom lenses, a large amount of decentration aberration occurs in image stabilization on the telephoto side, and this is difficult to correct.

SUMMARY OF THE INVENTION

The present invention is directed to a zoom lens having a high zoom ratio and high optical performance throughout the entire zoom range, and an image pickup apparatus having the same.

In an aspect of the present invention, a zoom lens includes, in order from the object side to the image side, a first lens unit having a positive refractive power, a second lens unit having a negative refractive power, and a third lens unit having a positive refractive power. The first lens unit and the third lens unit move in the optical axis direction during zooming. The following conditions are satisfied:

$$0.60 < m3/m1 < 0.90, \text{ and}$$

$$0.080 < |f2/ft| < 0.120,$$

where m1 and m3 are maximum moving distances in the optical axis direction of the first lens unit and the third lens unit, respectively, during zooming from a wide-angle end to a telephoto end, ft is a focal length of the zoom lens at the telephoto end, and f2 is a focal length of the second lens unit.

Further features of the present invention will become apparent from the following description of exemplary embodiments with reference to the attached drawings.

BRIEF DESCRIPTION OF THE DRAWINGS

FIG. 1 is a sectional view of a zoom lens of Embodiment 1 at the wide-angle end.

FIG. 3B is a horizontal aberration diagram of the zoom lens of Embodiment 1 at the telephoto end in standard condition.

FIG. 5 is a sectional view of a zoom lens of Embodiment 2 at the wide-angle end.

FIG. 7B is a horizontal aberration diagram of the zoom lens of Embodiment 2 at the telephoto end in standard condition.

FIG. 9 is a sectional view of a zoom lens of Embodiment 3 at the wide-angle end.

FIG. 10A is a vertical aberration diagram of the zoom lens of Embodiment 3 at the wide-angle end.

FIG. 13 is a sectional view of a zoom lens of Embodiment 4 at the wide-angle end.

FIG. 14A is a vertical aberration diagram of the zoom lens of Embodiment 4 at the wide-angle end.

FIG. 14B is a vertical aberration diagram of the zoom lens of Embodiment 4 at the telephoto end.

FIG. 15A is a horizontal aberration diagram of the zoom lens of Embodiment 4 at the wide-angle end in standard condition.

FIG. 15B is a horizontal aberration diagram of the zoom lens of Embodiment 4 at the telephoto end in standard condition.

DESCRIPTION OF THE EMBODIMENTS

The embodiments of the present invention will now be described.

FIG. 1 is a sectional view of a zoom lens of Embodiment 1 of the present invention when an object at infinity is in focus at the wide-angle end (short focal length end).

Figure 2A:
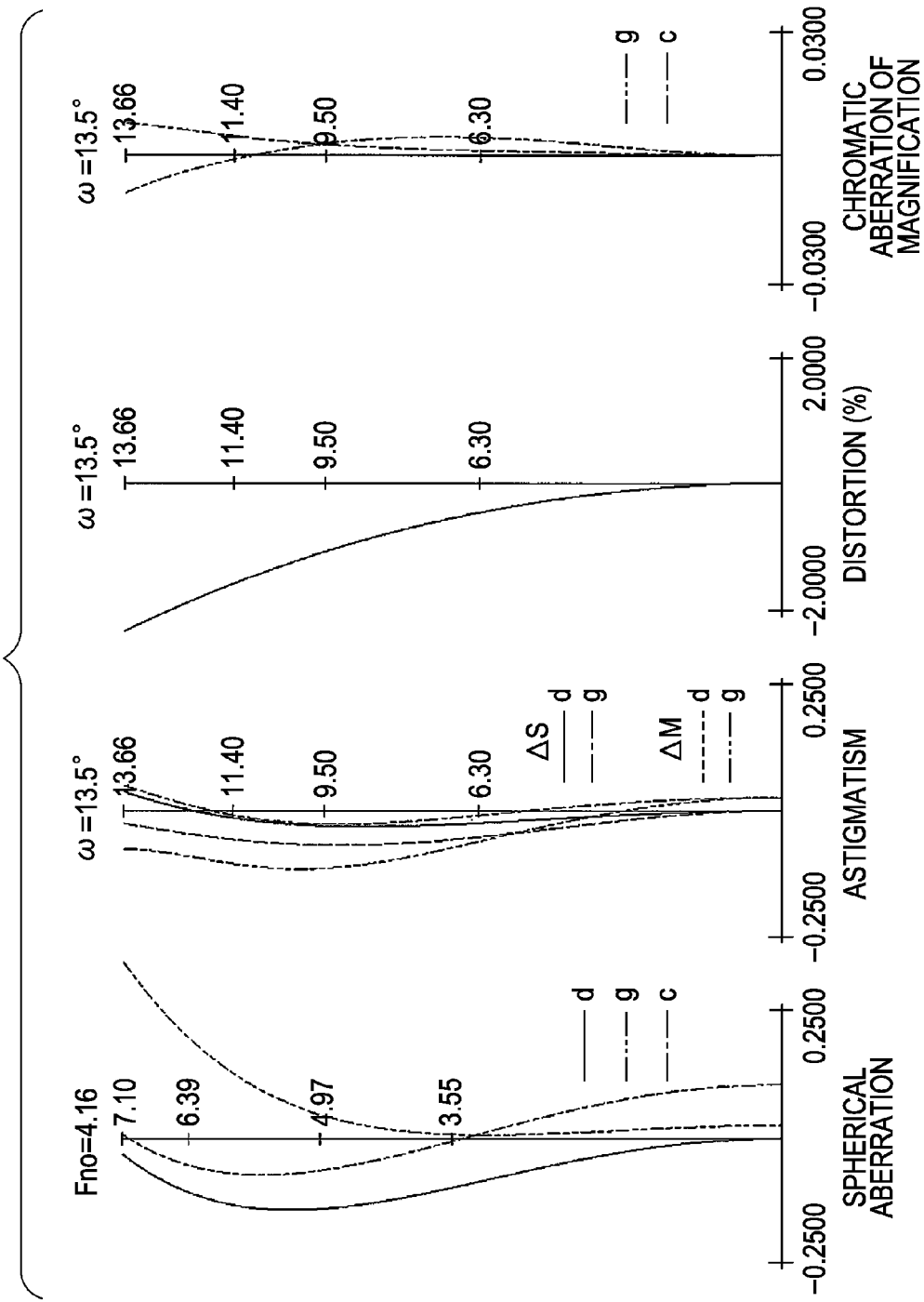
FIG. 2A is a vertical aberration diagram of the zoom lens of Embodiment 1 at the wide-angle end.
Figure 2B:
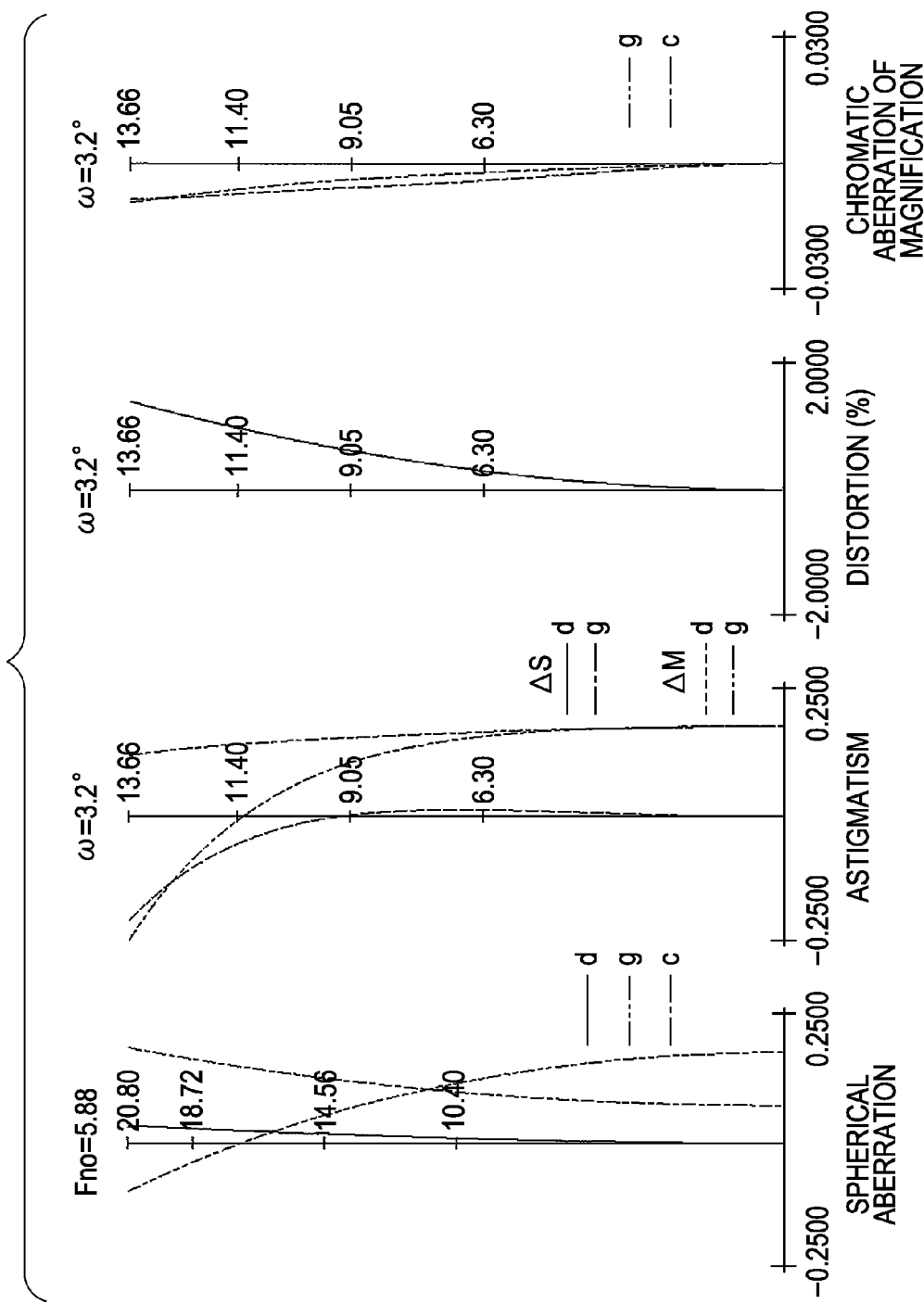
FIG. 2B is a vertical aberration diagram of the zoom lens of Embodiment 1 at the telephoto end.

FIGS. 2A and 2B are vertical aberration diagrams when an object at infinity is in focus at the wide-angle end and the telephoto end (long focal length end) of the zoom lens of Embodiment 1.

Figure 3A:
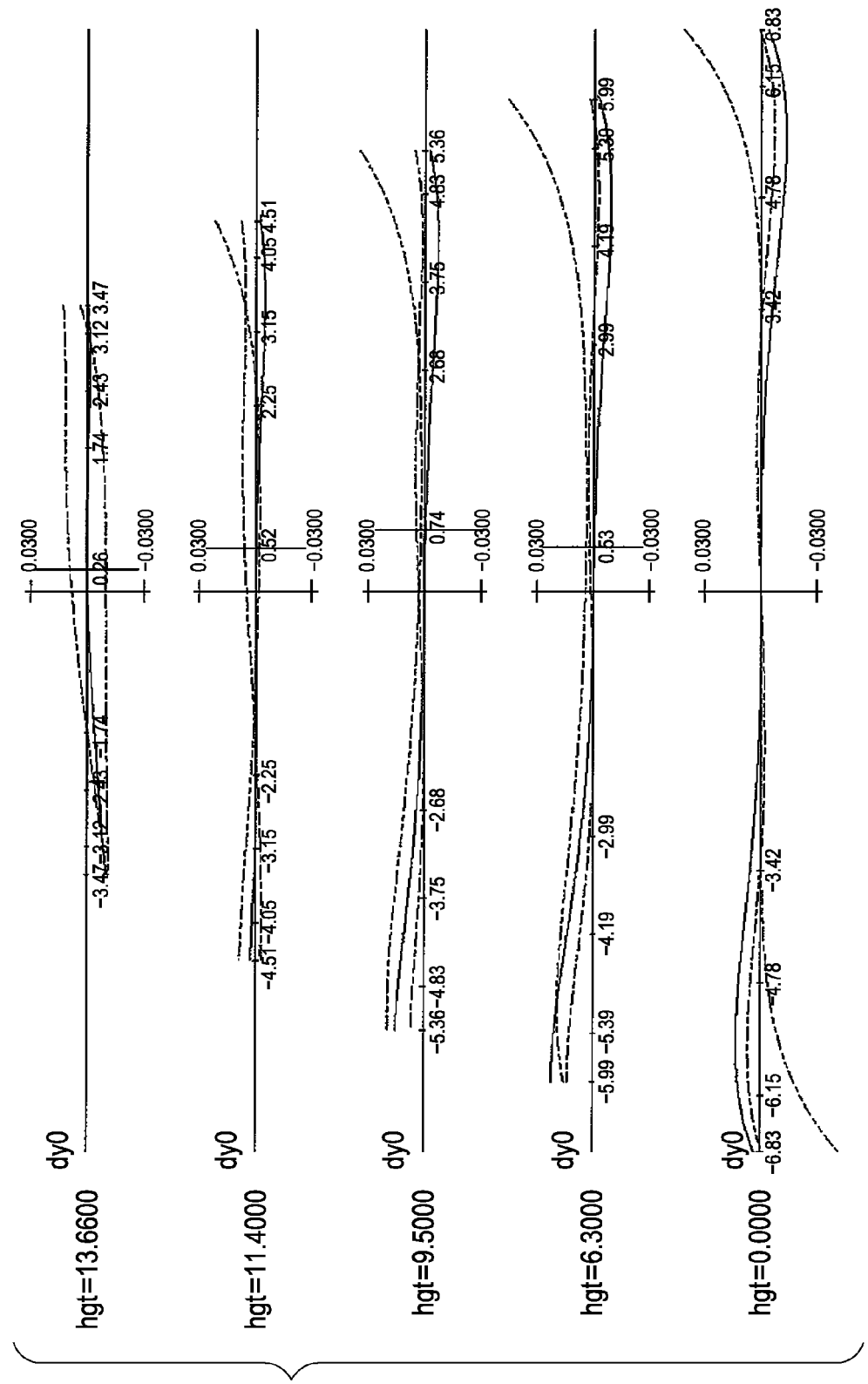
FIG. 3A is a horizontal aberration diagram of the zoom lens of Embodiment 1 at the wide-angle end in standard condition.

FIGS. 3A and 3B are horizontal aberration diagrams when an object at infinity is in focus at the wide-angle end and the telephoto end of the zoom lens of Embodiment 1 in standard condition (where image stabilization is not performed).

Figure 4A:
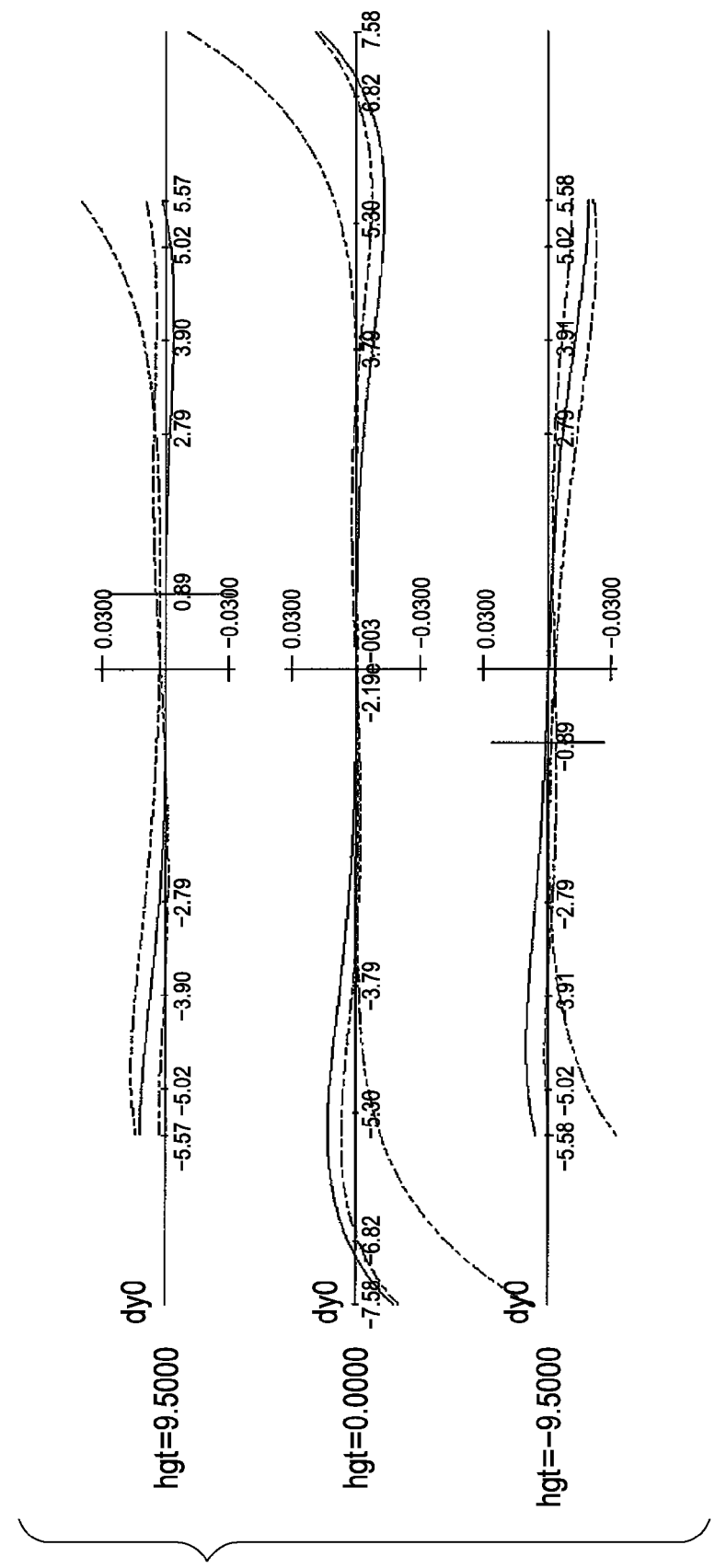
FIG. 4A is a horizontal aberration diagram of the zoom lens of Embodiment 1 at the wide-angle end under image stabilization.
Figure 4B:
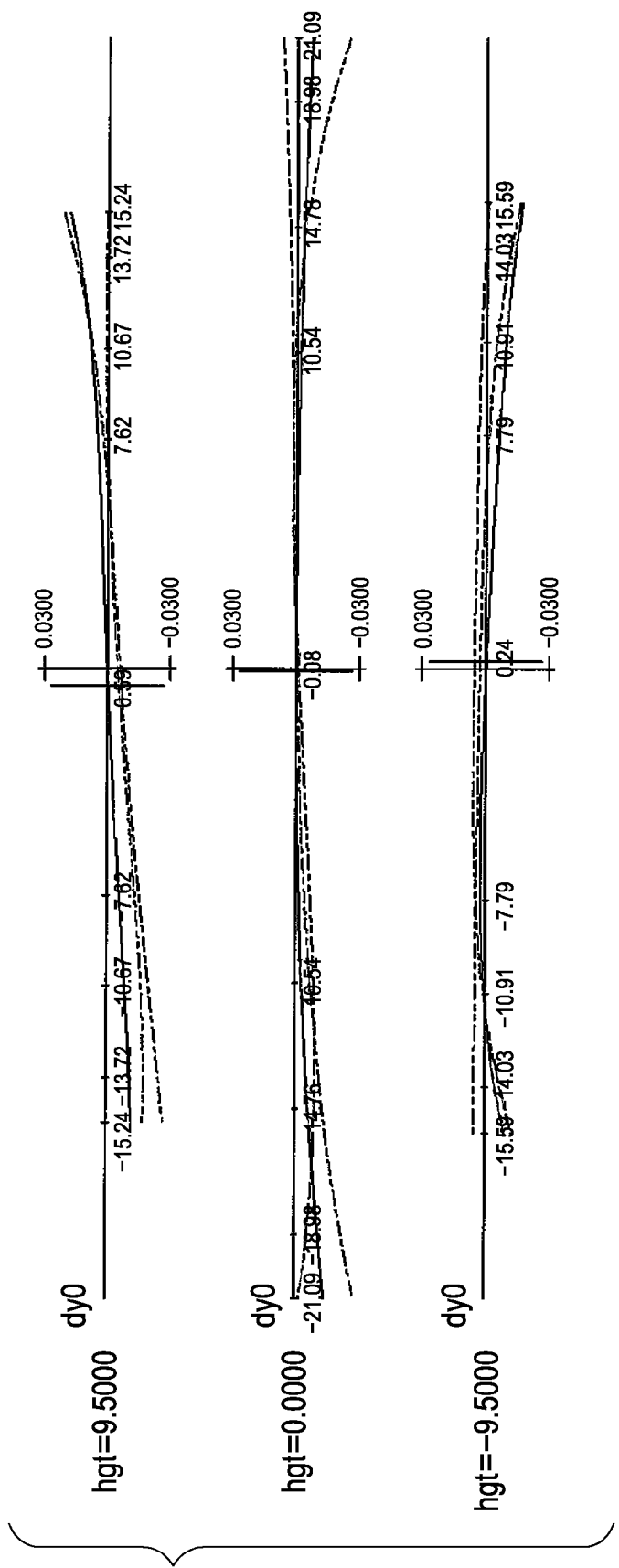
FIG. 4B is a horizontal aberration diagram of the zoom lens of Embodiment 1 at the telephoto end under image stabilization.

FIGS. 4A and 4B are horizontal aberration diagrams when an object at infinity is in focus at the wide-angle end and the telephoto end of the zoom lens of Embodiment 1 and image stabilization is performed with the zoom lens inclined at 0.3 degrees.

FIG. 5 is a sectional view of a zoom lens of Embodiment 2 of the present invention when an object at infinity is in focus at the wide-angle end.

Figure 6A:
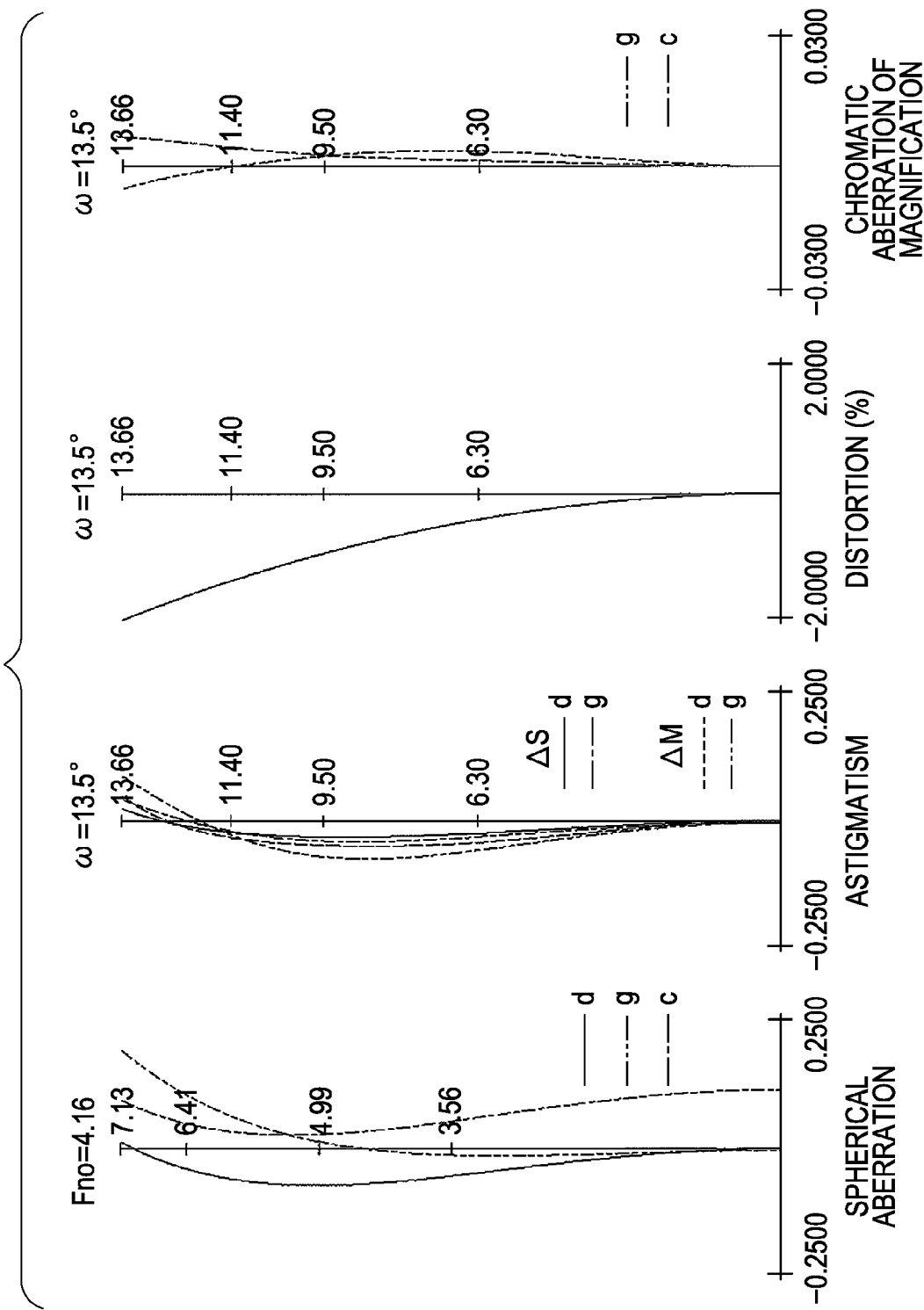
FIG. 6A is a vertical aberration diagram of the zoom lens of Embodiment 2 at the wide-angle end.
Figure 6B:
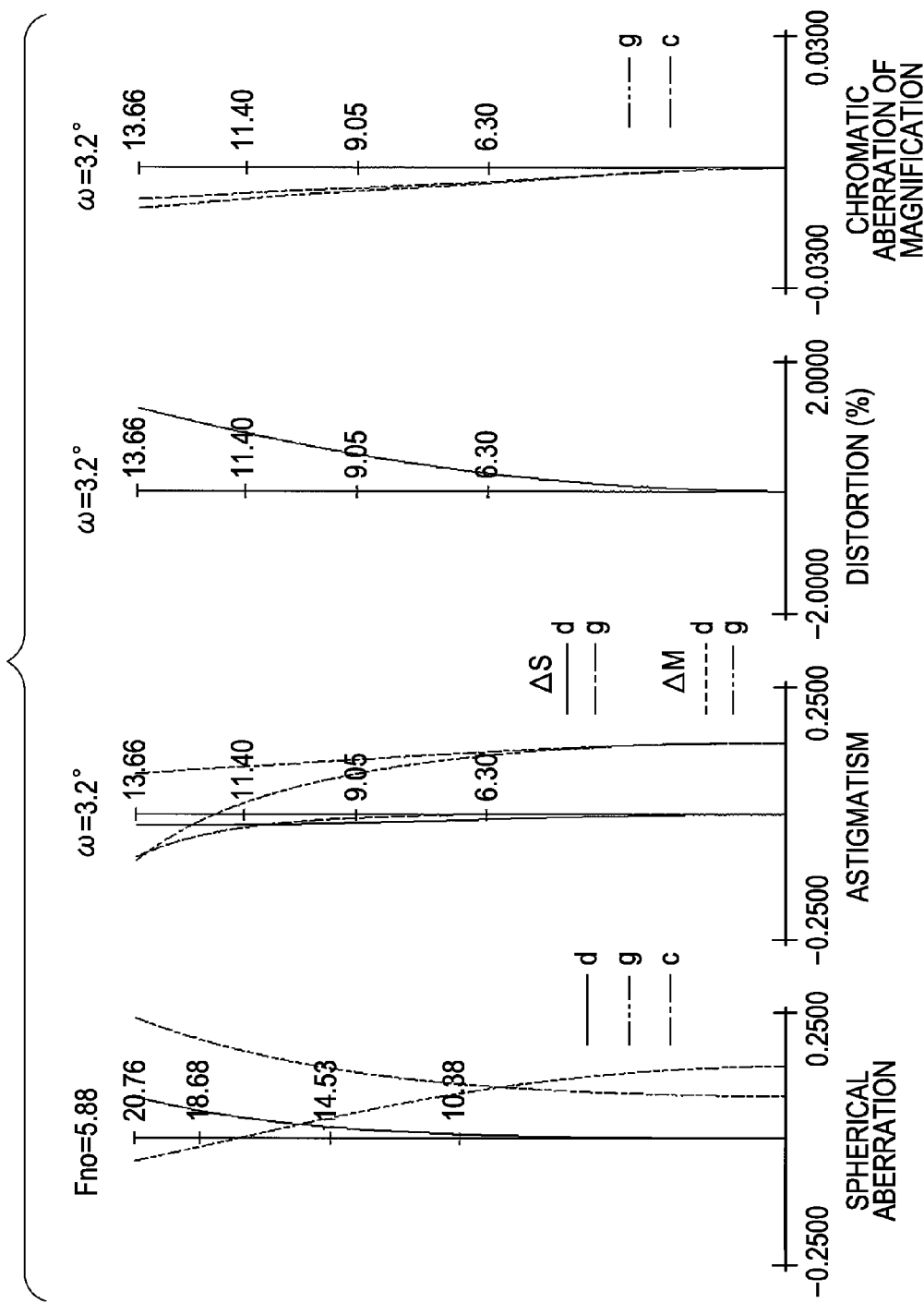
FIG. 6B is a vertical aberration diagram of the zoom lens of Embodiment 2 at the telephoto end.

FIGS. 6A and 6B are vertical aberration diagrams when an object at infinity is in focus at the wide-angle end and the telephoto end of the zoom lens of Embodiment 2.

Figure 7A:
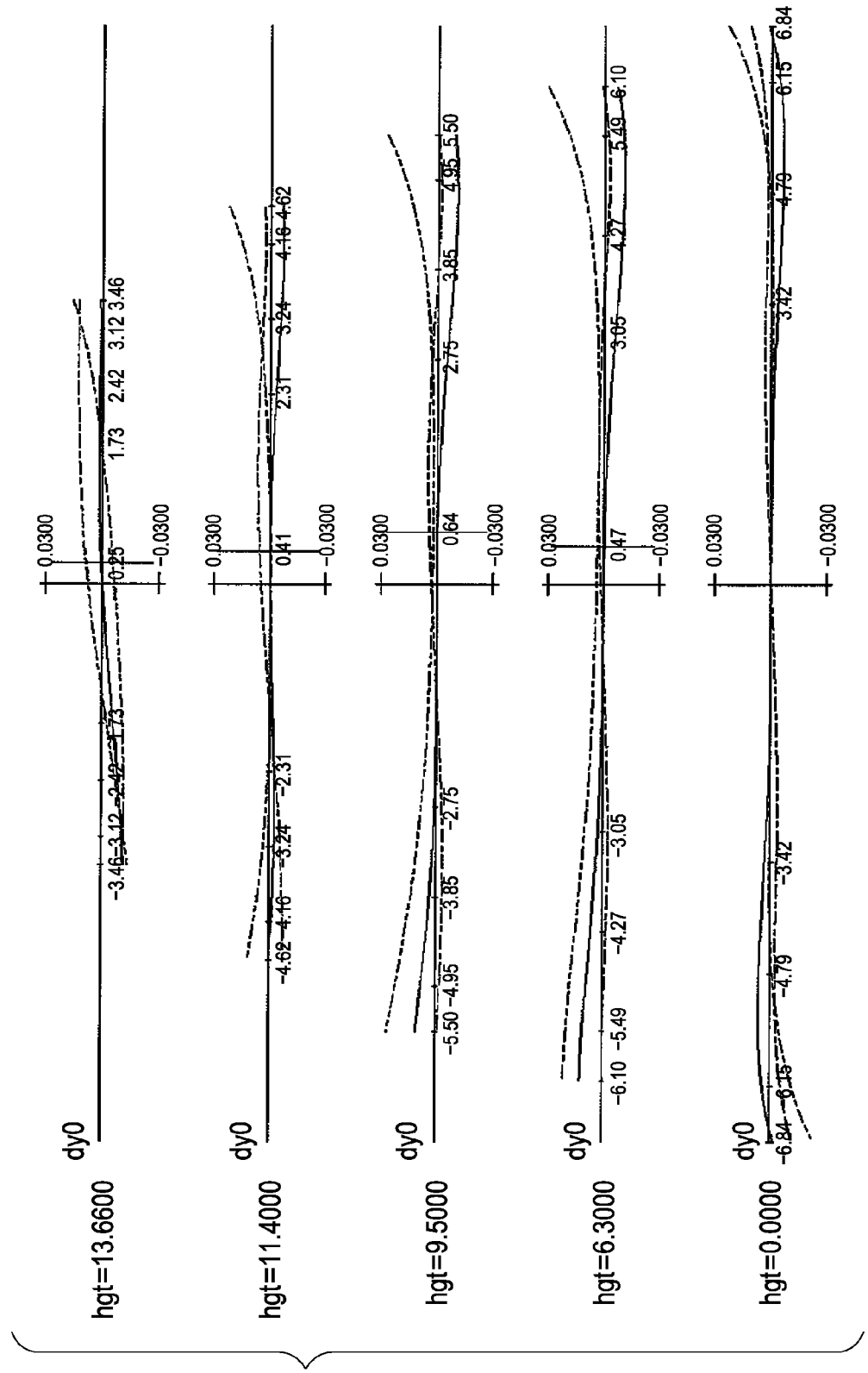
FIG. 7A is a horizontal aberration diagram of the zoom lens of Embodiment 2 at the wide-angle end in standard condition.

FIGS. 7A and 7B are horizontal aberration diagrams when an object at infinity is in focus at the wide-angle end and the telephoto end of the zoom lens of Embodiment 2 in standard condition.

Figure 8A:
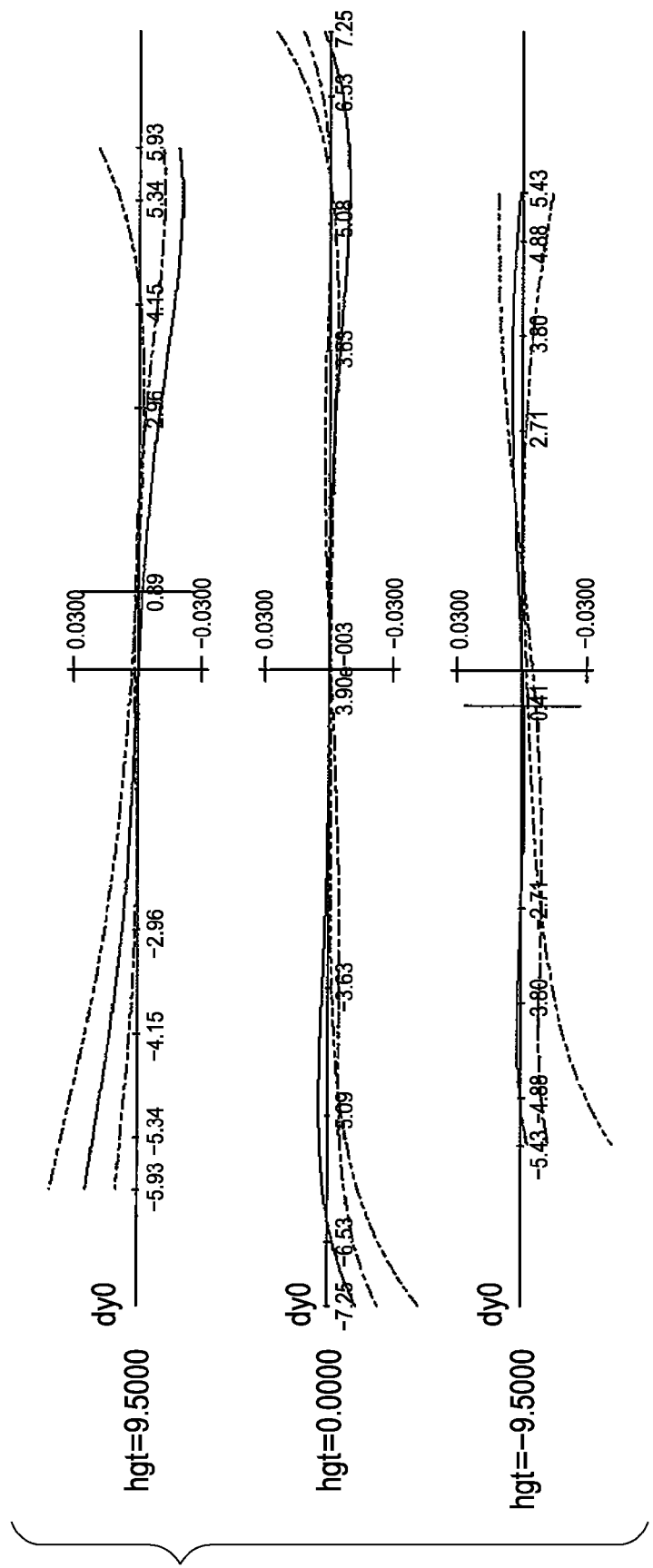
FIG. 8A is a horizontal aberration diagram of the zoom lens of Embodiment 2 at the wide-angle end under image stabilization.
Figure 8B:
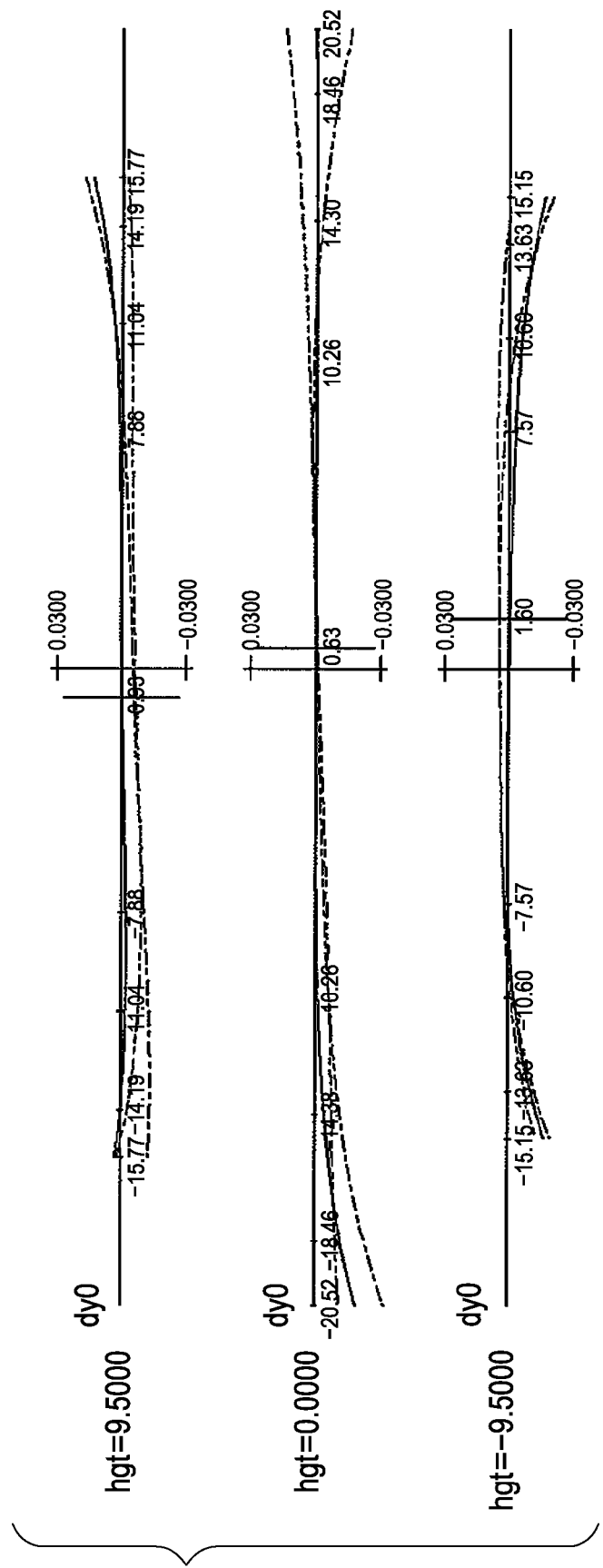
FIG. 8B is a horizontal aberration diagram of the zoom lens of Embodiment 2 at the telephoto end under image stabilization.

FIGS. 8A and 8B are horizontal aberration diagrams when an object at infinity is in focus at the wide-angle end and the telephoto end of the zoom lens of Embodiment 2 and image stabilization is performed with the zoom lens inclined at 0.3 degrees.

FIG. 9 is a sectional view of a zoom lens of Embodiment 3 of the present invention when an object at infinity is in focus at the wide-angle end.

Figure 10B:
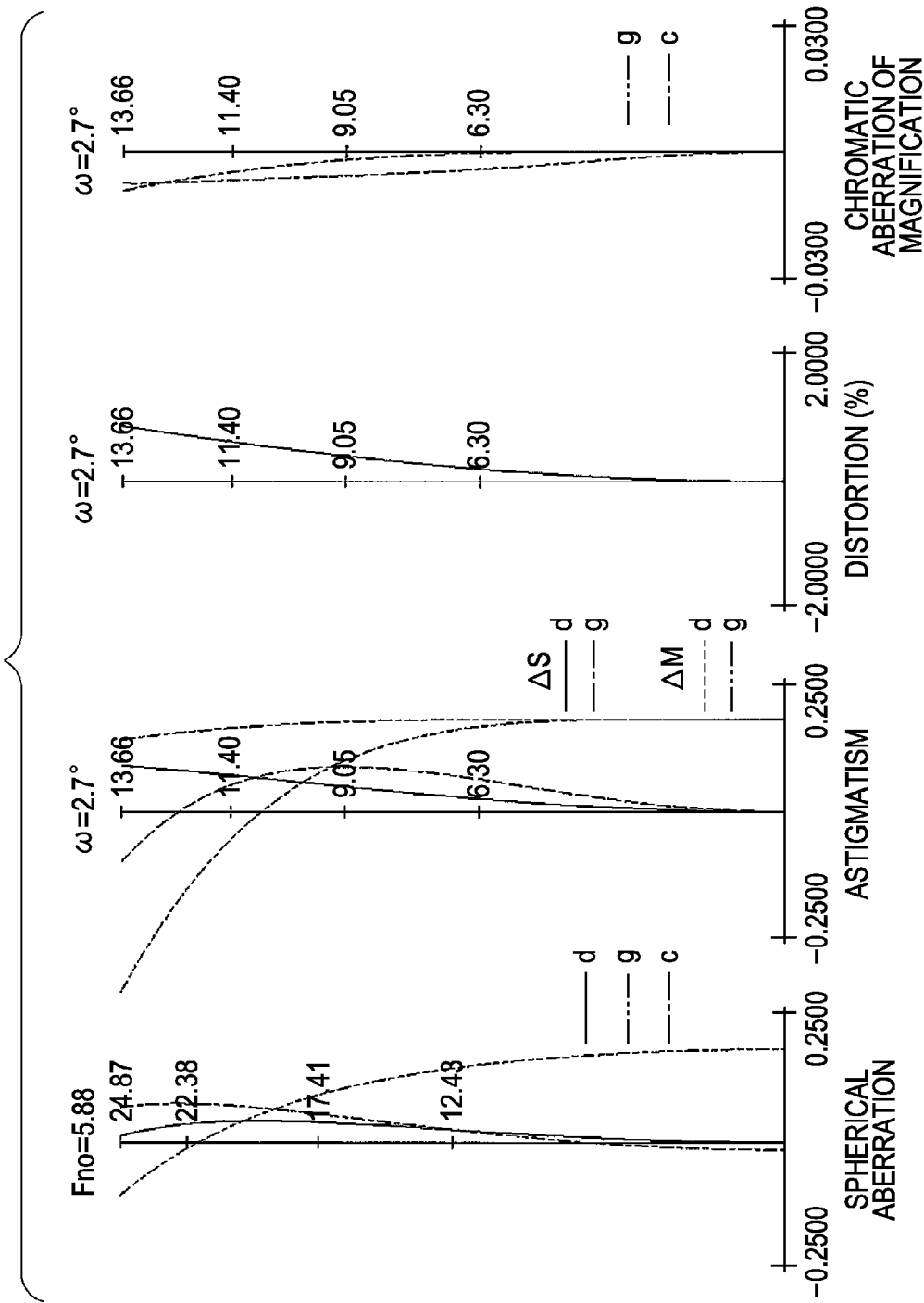
FIG. 10B is a vertical aberration diagram of the zoom lens of Embodiment 3 at the telephoto end.

FIGS. 10A and 10B are vertical aberration diagrams when an object at infinity is in focus at the wide-angle end and the telephoto end of the zoom lens of Embodiment 3.

Figure 11A:
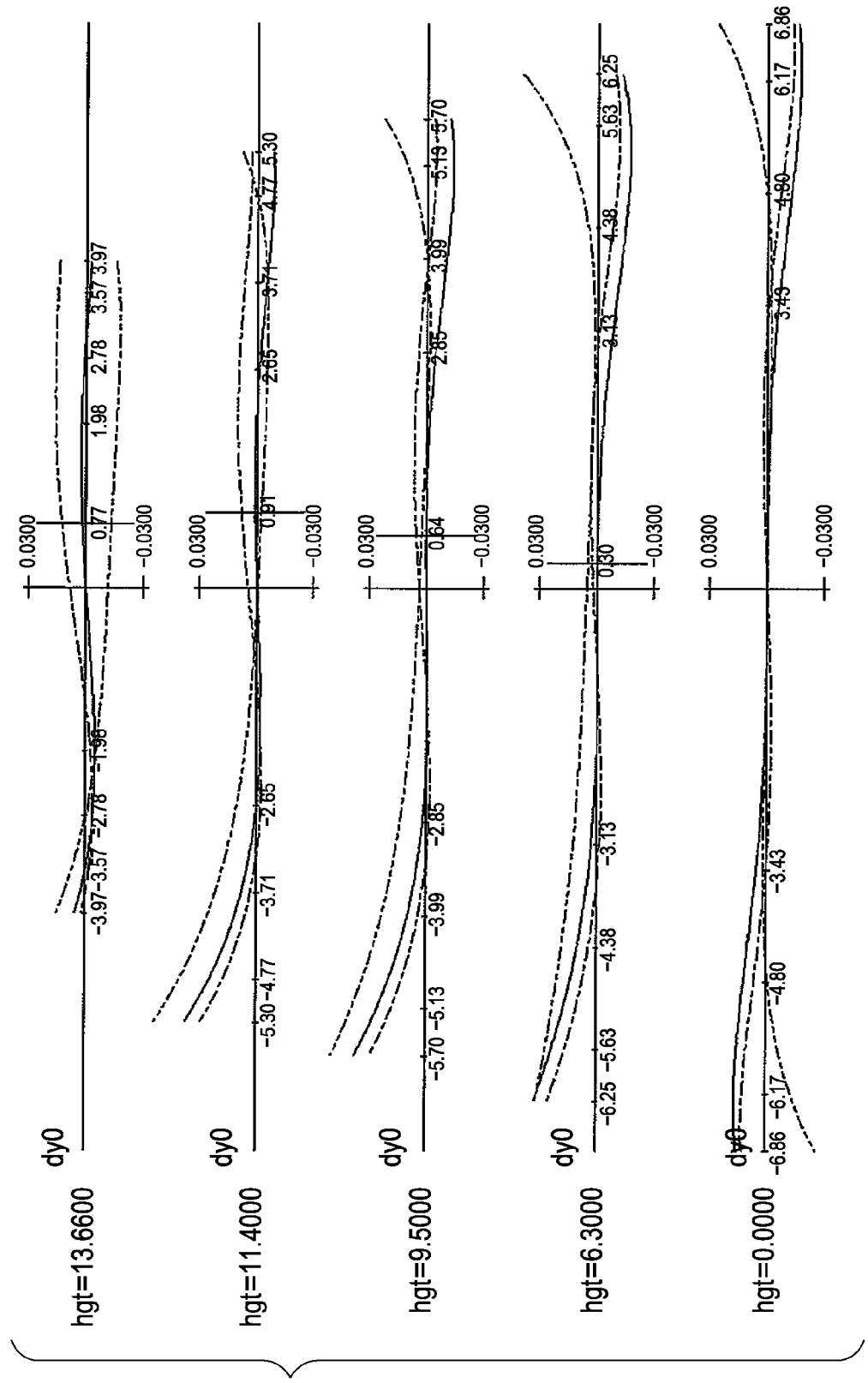
FIG. 11A is a horizontal aberration diagram of the zoom lens of Embodiment 3 at the wide-angle end in standard condition.
Figure 11B:
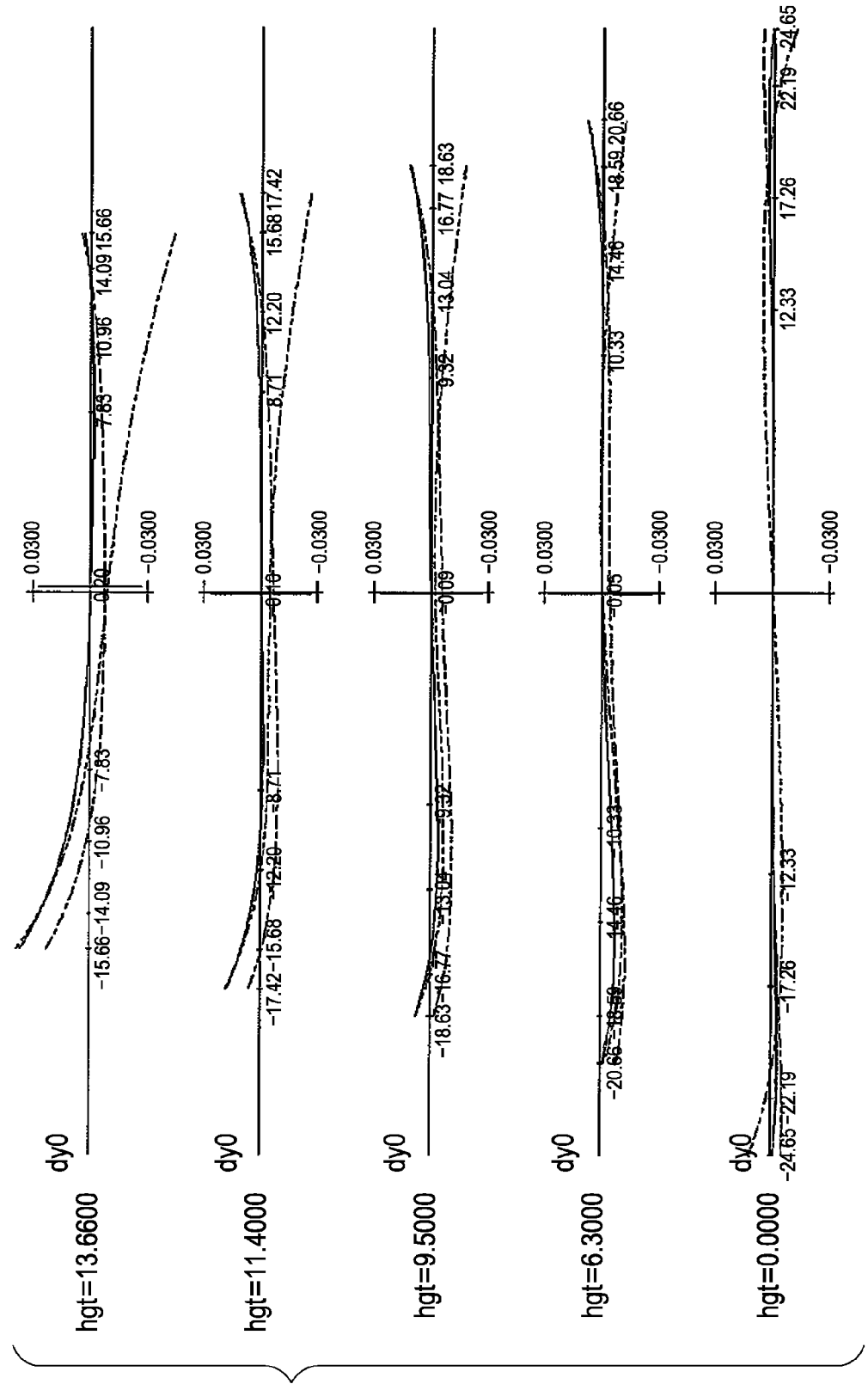
FIG. 11B is a horizontal aberration diagram of the zoom lens of Embodiment 3 at the telephoto end in standard condition.

FIGS. 11A and 11B are horizontal aberration diagrams when an object at infinity is in focus at the wide-angle end and the telephoto end of the zoom lens of Embodiment 3 in standard condition.

Figure 12A:
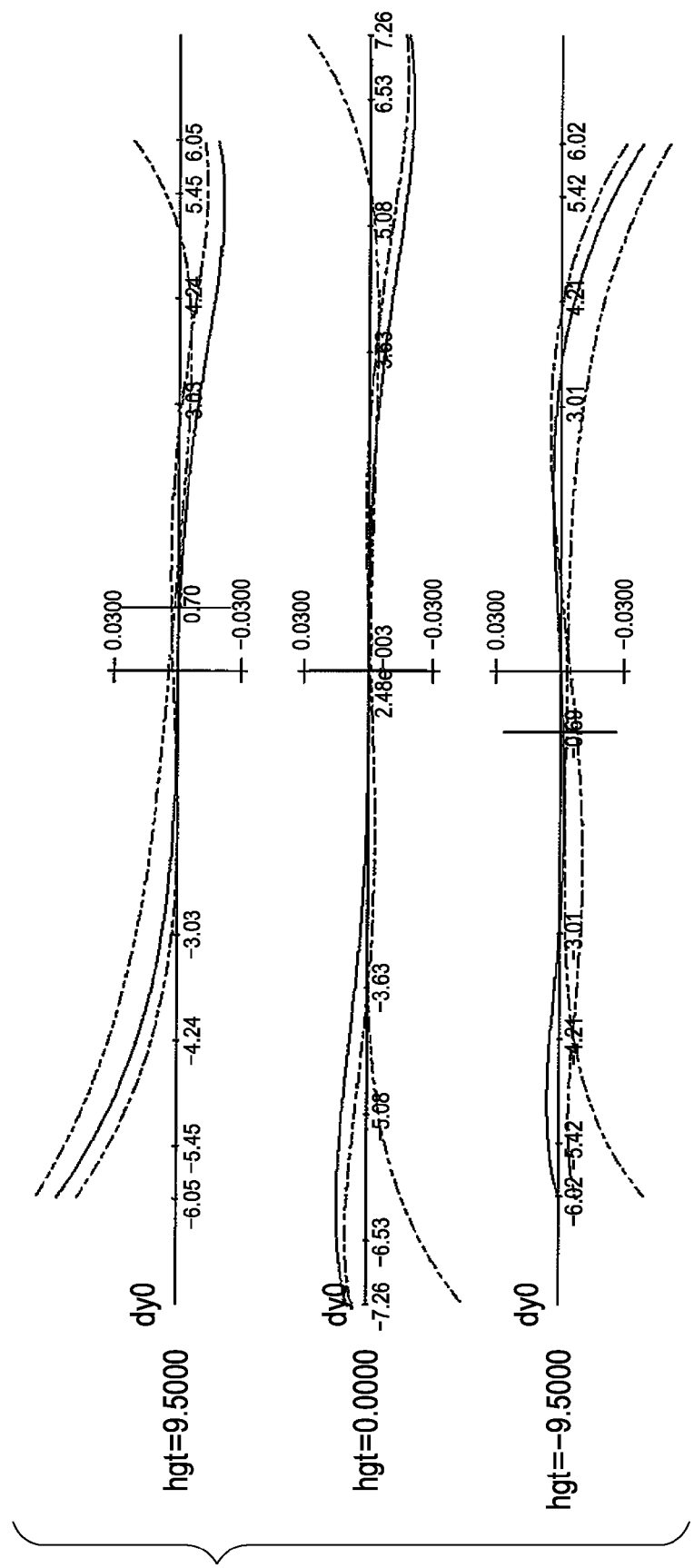
FIG. 12A is a horizontal aberration diagram of the zoom lens of Embodiment 3 at the wide-angle end under image stabilization.
Figure 12B:
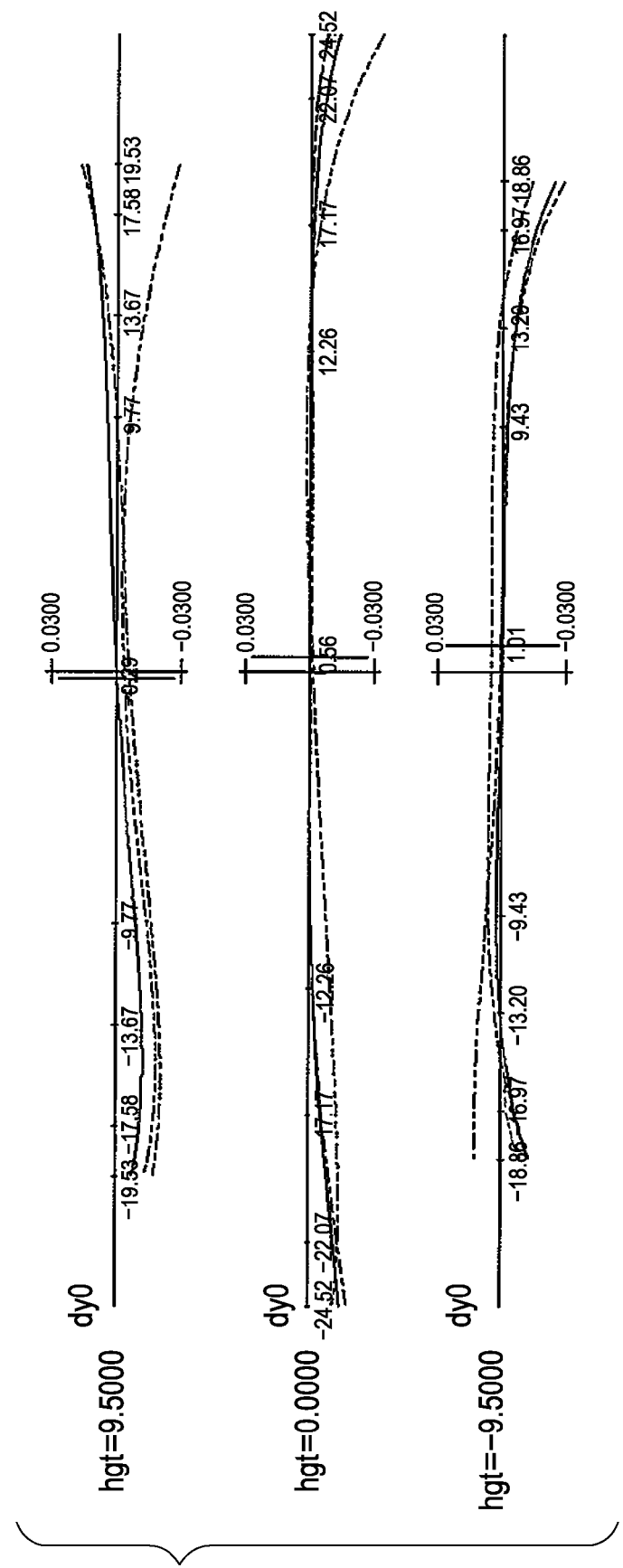
FIG. 12B is a horizontal aberration diagram of the zoom lens of Embodiment 3 at the telephoto end under image stabilization.

FIGS. 12A and 12B are horizontal aberration diagrams when an object at infinity is in focus at the wide-angle end and the telephoto end of the zoom lens of Embodiment 3 and image stabilization is performed with the zoom lens inclined at 0.3 degrees.

FIG. 13 is a sectional view of a zoom lens of Embodiment 4 of the present invention when an object at infinity is in focus at the wide-angle end.

FIGS. 14A and 14B are vertical aberration diagrams when an object at infinity is in focus at the wide-angle end and the telephoto end of the zoom lens of Embodiment 4.

FIGS. 15A and 15B are horizontal aberration diagrams when an object at infinity is in focus at the wide-angle end and the telephoto end of the zoom lens of Embodiment 4 in standard condition.

Figure 16A:
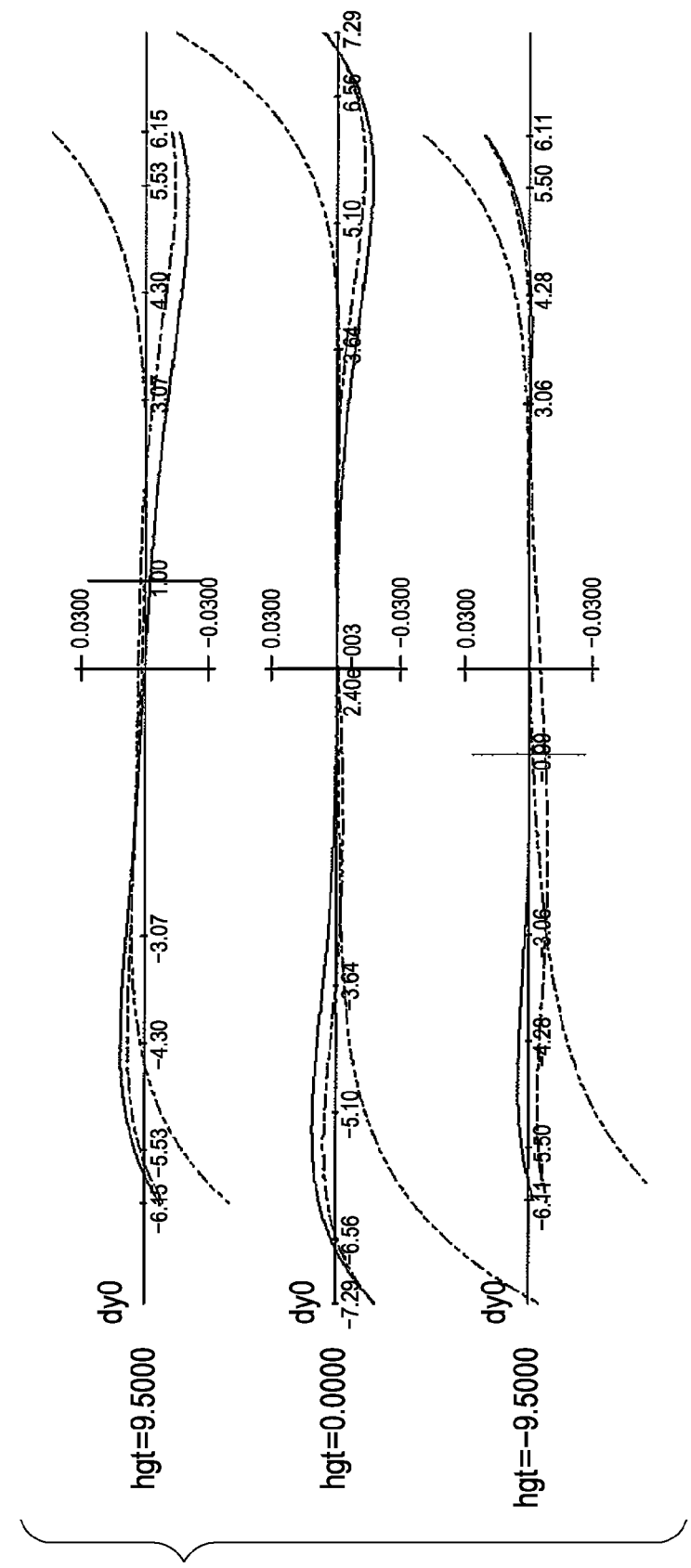
FIG. 16A is a horizontal aberration diagram of the zoom lens of Embodiment 4 at the wide-angle end under image stabilization.
Figure 16B:
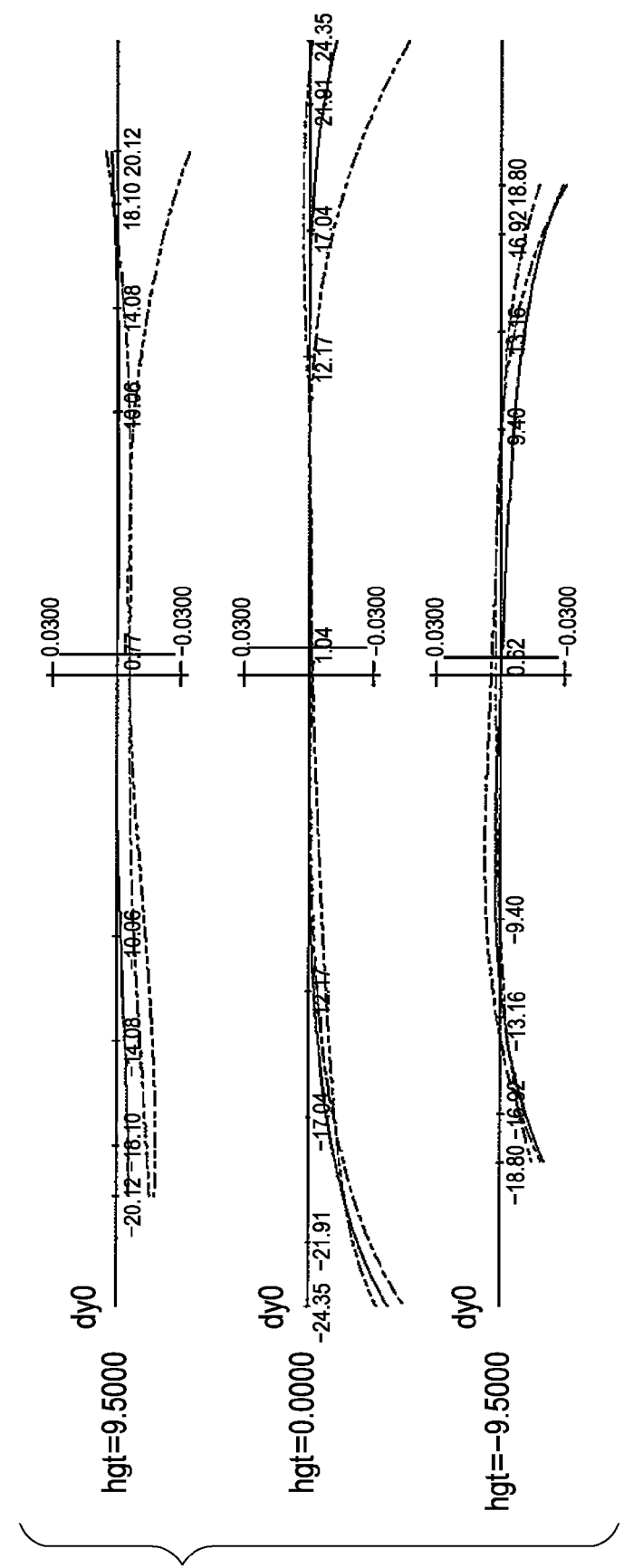
FIG. 16B is a horizontal aberration diagram of the zoom lens of Embodiment 4 at the telephoto end under image stabilization.

FIGS. 16A and 16B are horizontal aberration diagrams when an object at infinity is in focus at the wide-angle end and the telephoto end of the zoom lens of Embodiment 4 and image stabilization is performed with the zoom lens inclined at 0.3 degrees.

Figure 17:
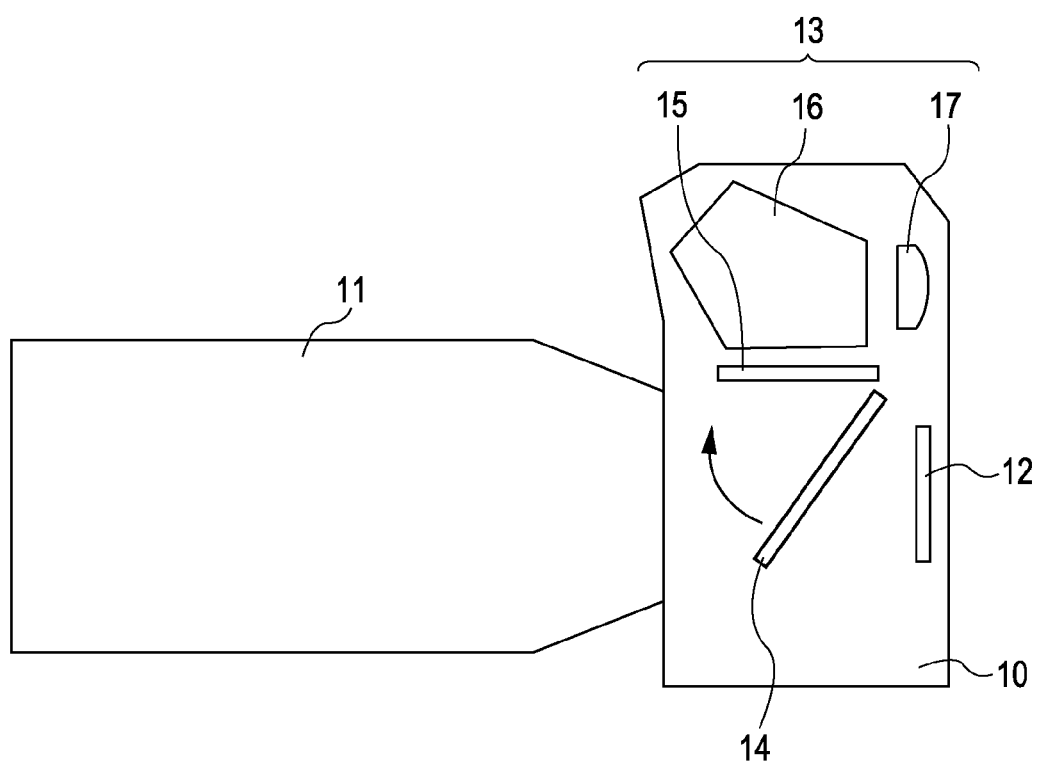
FIG. 17 is a schematic view of an image pickup apparatus of the present invention.

FIG. 17 is a schematic view of a camera (image pickup apparatus) having a zoom lens of the present invention.

The zoom lens of each embodiment is a photographing lens system used in image pickup apparatuses such as video cameras, digital cameras, and silver-halide film cameras.

In the lens sectional views, the left side is the object side (the front side), and the right side is the image side (the rear side). In the lens sectional views, reference letter Li denotes the i-th lens unit from the object side.

In the lens sectional views, reference letter L1 denotes a first lens unit having a positive refractive power (optical power=the inverse of the focal length), reference letter L2 denotes a second lens unit having a negative refractive power, and reference letter L3 denotes a third lens unit having a positive refractive power.

In the lens sectional views of FIGS. 1 and 9, reference letter L4 denotes a fourth lens unit.

Reference letter SP denotes an aperture stop, which is disposed on the object side of the third lens unit L3 or in the third lens unit L3.

Reference letter IP denotes an image plane, where a light-sensitive plane is placed. When the zoom lens is used as a photographing optical system for a video camera or a digital still camera, the light-sensitive plane corresponds to the image pickup plane of a solid-state image pickup element (photoelectric conversion element) such as a CCD sensor or a CMOS sensor. In the case of a silver-halide film camera, the light-sensitive plane corresponds to the film plane.

In the aberration diagrams, reference letters d, g, and C denote the d-line, g-line, and C-line, respectively. Reference letters ΔM and ΔS denote the meridional image plane and the sagittal image plane, respectively. The chromatic aberration of magnification is indicated by the g-line.

Reference letter ω denotes the half field angle. Reference letter Fno denotes the F-number.

In the horizontal aberration diagrams, reference letter hgt denotes the image height. The solid line shows the d-line, the two-dot chain line shows the g-line, and the chain line shows the C-line. In the horizontal aberration diagrams, the horizontal axis represents the height on the pupil plane.

In the following embodiments, the wide-angle end and the telephoto end refer to zoom positions when the lens units for zooming (first and second lens units L1 and L3) are at either end of mechanically movable range on the optical axis.

Arrows show moving loci of the lens units in zooming from the wide-angle end to the telephoto end.

In Embodiments 1 and 3 of FIGS. 1 and 9, in zooming from the wide-angle end to the telephoto end, the first, third, and fourth lens units L1, L3, and L4 move to the object side as shown by arrows.

The second lens unit L2 does not move for zooming.

In Embodiments 2 and 4 of FIGS. 5 and 13, in zooming from the wide-angle end to the telephoto end, the first and third lens units L1 and L3 move to the object side as shown by arrows.

The second lens unit L2 moves in a locus convex toward the image side so as to correct an image plane variation accompanying the zooming.

In the zoom lens of each embodiment, the first lens unit L1 and the third lens unit L3 move in zooming from the wide-angle end to the telephoto end.

Focusing is performed by moving the first lens unit L1 in the optical axis direction.

Focusing may be performed by moving the whole zoom lens or any one of the lens units.

In each embodiment, the second lens unit L2 moves so as to have a component in a direction perpendicular to the optical axis, thereby displacing the image perpendicularly to the optical axis and thereby correcting an image blur when the whole zoom lens is vibrated. That is, image stabilization is performed.

First, characteristics of a multi-unit zoom lens including a plurality of lens units will be described. A zoom lens requires at least two lens units that move independently from each other in the optical axis direction. Therefore, the term "multi-unit" herein refers to a zoom lens having three or more lens units.

It is easy for a multi-unit zoom lens to have a high zoom ratio. In addition, since the burden of aberration correction can be easily equalized among the lens units, excellent imaging performance can be easily obtained. However, an increase in the number of the lens units moving along the optical axis complicates the lens barrel structure.

In the zoom lens of each embodiment, the mechanism is simplified by adopting a three-unit configuration or four-unit configuration based on the above-described technical base and background of multi-unit zoom lenses.

In addition, by appropriately setting the moving distance, focal length, and so forth of each lens unit, a zoom ratio of four times or more is ensured, and excellent imaging performance is obtained.

Since the zoom lens of each embodiment has excellent imaging performance even under image stabilization, they are suitable for image pickup apparatuses having, for example, a solid-state image pickup element.

In each embodiment, the zoom lens has, in order from the object side to the image side, a first lens unit L1 having a positive refractive power, a second lens unit L2 having a negative refractive power, and a third lens unit L3 having a positive refractive power. In zooming, the first lens unit L1 and the third lens unit L3 move in the optical axis direction.

The following conditions are satisfied:

$$0.60 < m3/m1 < 0.90 \quad (1)$$

$$0.080 < |f2/ft| < 0.120 \quad (2)$$

where m1 and m3 are maximum moving distances in the optical axis direction of the first lens unit L1 and the third lens unit L3, respectively, in zooming from the wide-angle end to the telephoto end, ft is a focal length of the zoom lens at the telephoto end, and f2 is a focal length of the second lens unit L2.

The conditional expression (1) relates to the ratio between moving distances (maximum moving distances) of the first lens unit L1 and the third lens unit L3 in zooming from the wide-angle end to the telephoto end.

The sign convention used here is such that the moving distance from the object side to the image side is positive. When the lens units reciprocate, the term "maximum moving distance" refers to the maximum value of the absolute value of a moving distance in the optical axis direction.

If the m3/m1 exceeds the upper limit of the conditional expression (1) and the moving distance of the third lens unit L3 becomes larger than that of the first lens unit L1, this is advantageous to the achievement of a high zoom ratio. However, it is necessary to beforehand ensure a sufficiently large distance between the second lens unit L2 and the third lens unit L3 at the wide-angle end. As a result, the whole system (the overall length of the lens) becomes long at the wide-angle end.

In order to incorporate the zoom lens into a camera having an auto-focus function, it is necessary to minimize the fluctuation of the exit pupil position. In the three-unit or four-unit zoom lens in each embodiment, the aperture stop SP is located on the object side of the third lens unit L3 or in the lens system. Therefore, if the moving distance of the third lens unit L3 becomes larger than that of the first lens unit L1, the change in the pupil position increases. In addition, the structure of the aperture stop SP is complicated.

On the other hand, if the m3/m1 falls below the lower limit of the conditional expression (1) and the moving distance of the third lens unit L3 becomes smaller than that of the first lens unit L1, zooming is performed mainly by the second lens unit L2, and it becomes difficult to obtain a high zoom ratio of four times or more, or the fluctuations of aberrations in zooming increase to make aberration correction difficult.

The conditional expression (2) defines the focal length of the second lens unit L2. Exceeding the upper limit of the conditional expression (2) necessitates a large moving distance of the first lens unit L1 for zooming, thereby disadvantageously increasing the overall length of the lens at the telephoto end, or increases the moving distance of the first lens unit L1 in zooming, thereby making the whole system difficult to downsize.

Although falling below the lower limit of the conditional expression (2) is advantageous to the achievement of a high zoom ratio, this increases the Petzval sum in the negative direction and makes astigmatism correction difficult throughout the entire zoom range.

When the second lens unit L2 is moved so as to have a component in a direction perpendicular to the optical axis for image stabilization, an insufficient correction of aberrations occurring in the second lens unit L2 makes it difficult to correct aberrations due to the lens units on the image side of the second lens unit L2.

On the other hand, in an optical system having image stabilization performance, a large image blur should be corrected by a small moving distance of the movable lens unit for image stabilization. If the moving distance of the movable lens unit for image stabilization is large, the movable lens unit needs to have a large effective diameter in order to eliminate the eclipse of rays under image stabilization.

As a result, the movable lens unit increases in size and weight. In order to increase the decentration sensitivity of the second lens unit L2, which is a movable lens unit, it is necessary to strengthen the power of the second lens unit L2. The decentration sensitivity is the ratio $\Delta x/\Delta H$ of the amount of image blur correction ($\Delta x$) to the unit moving distance of the movable lens unit ($\Delta H$).

In each embodiment, the refractive power of the second lens unit L2 is set so as to satisfy the conditional expression (2).

In each embodiment, the second lens unit L2 has a cemented lens consisting of a negative lens and a positive lens, and a negative lens so that the decentration aberration under image stabilization is small.

The following condition is satisfied:

$$0.30 < |f1/ft| < 0.60 \qquad (3)$$

where f1 is a focal length of the first lens unit L1.

When the conditional expression (3) is satisfied, fluctuations of aberrations are small throughout the entire zoom range, and high optical performance can be obtained throughout the image plane.

The conditional expression (3) defines the focal length of the first lens unit L1, which moves in zooming. Exceeding the upper limit of the conditional expression (3) increases the overall length of the lens and the moving distance of the first lens unit L1 for zooming, thereby making the whole system difficult to downsize. Falling below the lower limit of the conditional expression (3) makes it difficult to correct the spherical aberration at the telephoto end and also to control the change in spherical aberration in focusing with the first lens unit L1.

In Embodiments 2 and 4, the second lens unit L2 moves in zooming.

The following condition is satisfied:

$$-0.150 < m2/m1 < 0.150 \qquad (4)$$

where m2 is a maximum moving distance in the optical axis direction of the second lens unit L2 in zooming from the wide-angle end to the telephoto end.

The conditional expression (4) relates to the ratio between maximum moving distances in the optical axis direction of the first lens unit L1 and the second lens unit L2 in zooming.

Exceeding the upper limit of the conditional expression (4) increases the moving distance of each lens unit in zooming and complicates the lens barrel structure, thereby making the whole system difficult to downsize. Falling below the lower limit of the conditional expression (4) increases the moving distance of the second lens unit L2, which moves in the opposite direction to the first lens unit L1, in zooming from the wide-angle end to the middle zooming position. Although this is advantageous to the zooming action of the second lens unit L2, this increases the aberration fluctuation in zooming.

In Embodiments 1 and 3, the second lens unit L2 does not move in zooming. This can simplify the lens barrel structure in zooming.

In Embodiments 1 and 3, in which the second lens unit L2 does not move in zooming, both the value of moving distance m2 and the value of conditional expression (4) are zero and within the range of the conditional expression (4).

In each embodiment, in terms of aberration correction, the numerical ranges of the conditional expressions (1) to (4) can be set as follows:

$$0.65 < m3/m1 < 0.88 \qquad (1a)$$

$$0.090 < |f2/ft| < 0.115 \qquad (2a)$$

$$0.35 < |f1/ft| < 0.55 \qquad (3a)$$

$$-0.100 < m2/m1 < 0.100 \qquad (4a)$$

As described above, each embodiment provides a telephoto type zoom lens that has a high zoom ratio of four times or more, the whole system of which is compact, and by which an aberration-free high-quality image can be obtained.

The following are numerical embodiments 1 to 4 corresponding to Embodiments 1 to 4. In each numerical embodiment, numbers (i) denote the order of surfaces from the object side, reference letter ri denotes the radius of curvature of the i-th surface, reference letter di denotes the distance between the i-th surface and the (i+1)th surface, and reference letters ndi and vdi denote the refractive index and the Abbe number, respectively, for the d-line. Reference letter f denotes the focal length, and reference letter Fno denotes the F-number.

Table 1 shows the relationship between the above conditional expressions and numerical values in the numerical embodiments.

| (Embodiment 1) | | | | | |
|---|---|---|---|---|---|
| f = 56.9~241.2 | | | | | |
| Fno = 4.16~5.88 | | | | | |
| | No | Radius of Curvature ri | Central Thickness or Space d | Refractive Index nd | Abbe Number vd |
| L1 | 1 | 76.22468 | 5.20464 | 1.51633 | 64.14 |
| | 2 | −1152.49 | 0.15 | | |
| | 3 | 72.7526 | 2.7 | 1.801 | 34.97 |
| | 4 | 38.8564 | 6.6983 | 1.497 | 81.54 |
| | 5 | 551.5342 | Variable | | |
| L2 | 6 | −302.113 | 1.5 | 1.713 | 53.87 |
| | 7 | 15.81844 | 3.67838 | 1.80518 | 25.42 |
| | 8 | 40.6568 | 2.20379 | | |
| | 9 | −37.8233 | 1.1 | 1.804 | 46.57 |
| | 10 | 212.9524 | Variable | | |
| L3 | 11 | 104.6464 | 2.55075 | 1.63854 | 55.38 |
| | 12 | −79.4679 | 0.15 | | |
| | 13 | 34.1519 | 3.49045 | 1.60311 | 60.64 |
| | 14 | −1375.32 | 1.68827 | | |
| | 15 | Stop | 0.48784 | | |
| | 16 | 27.16596 | 3.18055 | 1.48749 | 70.23 |
| | 17 | 1475.914 | 0.28925 | 1 | 0 |
| | 18 | −250.491 | 5.02487 | 1.84666 | 23.78 |
| | 19 | 33.7492 | Variable | | |
| L4 | 20 | 52.71323 | 1.39407 | 1.834 | 37.16 |
| | 21 | 20.87792 | 4.702 | | |
| | 22 | 31.7224 | 2.45403 | 1.68893 | 31.07 |
| | 23 | −253.852 | Variable | | |

| | f | d5 | d10 | d19 |
|---|---|---|---|---|
| Wide-angle End | 56.9 | 6.11986 | 27.79812 | 9.813071 |
| Middle Position | 131.2 | 32.39868 | 14.09047 | 9.468206 |
| Telephoto End | 241.2 | 43.66103 | 1.28085 | 11.71749 |

(Embodiment 2)

f = 56.9~241.3
Fno = 4.16~5.88

|   | No | Radius of Curvature ri | Central Thickness or Space d | Refractive Index nd | Abbe Number νd |
|---|---|---|---|---|---|
| L1 | 1 | 80.99515 | 4.75045 | 1.51633 | 64.14 |
|   | 2 | −808.56 | 0.15 |   |   |
|   | 3 | 77.54341 | 2.6 | 1.801 | 34.97 |
|   | 4 | 41.96489 | 5.6768 | 1.497 | 81.54 |
|   | 5 | 338.8565 | Variable |   |   |
| L2 | 6 | −209.128 | 1.4 | 1.713 | 53.87 |
|   | 7 | 19.23569 | 3.20257 | 1.84666 | 23.93 |
|   | 8 | 44.55107 | 2.32179 |   |   |
|   | 9 | −43.5451 | 1.1 | 1.804 | 46.57 |
|   | 10 | 278.5068 | Variable |   |   |
| L3 | 11 | 52.26289 | 2.99623 | 1.63854 | 55.38 |
|   | 12 | −95.0852 | 0.15 |   |   |
|   | 13 | 47.03856 | 2.89978 | 1.60311 | 60.64 |
|   | 14 | −231.037 | 1.56909 |   |   |
|   | 15 | Stop | 0.49801 |   |   |
|   | 16 | 30.2435 | 2.78922 | 1.48749 | 70.23 |
|   | 17 | 226.3014 | 0.60067 |   |   |
|   | 18 | −125.291 | 3.02154 | 1.84666 | 23.78 |
|   | 19 | 49.05197 | 11.42731 |   |   |
|   | 20 | 65.37414 | 2.01377 | 1.834 | 37.16 |
|   | 21 | 23.64292 | 8.70092 |   |   |
|   | 22 | 47.7313 | 2.36466 | 1.68893 | 31.07 |
|   | 23 | −173.907 | Variable |   |   |

| | f | d5 | d10 |
|---|---|---|---|
| Wide-angle End | 56.9 | 7.19326 | 31.47406 |
| Middle Position | 160.8 | 42.37555 | 11.1426 |
| Telephoto End | 241.3 | 47.94835 | 1.265538 |

(Embodiment 3)

f = 56.7~289.3
Fno = 4.16~5.88

|   | No | Radius of Curvature ri | Central Thickness or Space d | Refractive Index nd | Abbe Number νd |
|---|---|---|---|---|---|
| L1 | 1 | 78.99097 | 5.66338 | 1.48749 | 70.23 |
|   | 2 | −920.706 | 0.15 |   |   |
|   | 3 | 75.88704 | 2.6 | 1.834 | 37.16 |
|   | 4 | 41.6649 | 7.70231 | 1.497 | 81.54 |
|   | 5 | 566.634 | Variable |   |   |
| L2 | 6 | −363.861 | 1.4 | 1.713 | 53.87 |
|   | 7 | 18.37204 | 3.97396 | 1.80518 | 25.42 |
|   | 8 | 45.97589 | 2.84206 |   |   |
|   | 9 | −44.2167 | 1.1 | 1.804 | 46.57 |
|   | 10 | 251.943 | Variable |   |   |
| L3 | 11 | 146.9739 | 2.74541 | 1.63854 | 55.38 |
|   | 12 | −65.8563 | 0.15 |   |   |
|   | 13 | 29.49638 | 4.38952 | 1.497 | 81.54 |
|   | 14 | −341.682 | 1.66962 |   |   |
|   | 15 | Stop | 0.49722 |   |   |
|   | 16 | 23.57055 | 3.4819 | 1.48749 | 70.23 |
|   | 17 | 51.57009 | 1.212 |   |   |
|   | 18 | 2696.722 | 4.11863 | 1.84666 | 23.78 |
|   | 19 | 31.79237 | Variable |   |   |
| L4 | 20 | 44.80326 | 2.07965 | 1.83481 | 42.72 |
|   | 21 | 14.03633 | 1.74153 | 1.64769 | 33.79 |
|   | 22 | 22.37989 | 7.89662 |   |   |
|   | 23 | 32.23191 | 2.58522 | 1.6398 | 34.46 |
|   | 24 | 1657.931 | Variable |   |   |

-continued (Embodiment 3)

| | f | d5 | d10 | d19 |
|---|---|---|---|---|
| Wide-angle End | 56.9 | 3.68849 | 38.32357 | 11.10247 |
| Middle Position | 131.2 | 33.26701 | 19.12045 | 10.67706 |
| Telephoto End | 241.2 | 46.4363 | 1.20703 | 12.88161 |

(Embodiment 4)

f = 57.0~289.9
Fno = 4.16~5.88

|   | No | Radius of Curvature ri | Central Thickness or Space d | Refractive Index nd | Abbe Number νd |
|---|---|---|---|---|---|
| L1 | 1 | 76.39423 | 5.88295 | 1.48749 | 70.23 |
|   | 2 | −1544.96 | 0.15 |   |   |
|   | 3 | 76.25345 | 2.6 | 1.834 | 37.16 |
|   | 4 | 41.44739 | 7.80615 | 1.497 | 81.54 |
|   | 5 | 644.8738 | Variable |   |   |
| L2 | 6 | −273.734 | 1.4 | 1.713 | 53.87 |
|   | 7 | 18.19714 | 4.0894 | 1.80518 | 25.42 |
|   | 8 | 46.76466 | 2.8368 |   |   |
|   | 9 | −45.2903 | 1.1 | 1.804 | 46.57 |
|   | 10 | 260.7343 | Variable |   |   |
| L3 | 11 | Stop | 0.1381 |   |   |
|   | 12 | 2385.729 | 2.55985 | 1.60311 | 60.64 |
|   | 13 | −55.7586 | 0.15089 |   |   |
|   | 14 | 27.54721 | 3.81315 | 1.497 | 81.54 |
|   | 15 | 169.9752 | 0.37313 |   |   |
|   | 16 | 37.00327 | 2.98799 | 1.48749 | 70.23 |
|   | 17 | 226.1592 | 0.73012 |   |   |
|   | 18 | −174.98 | 2.4593 | 1.84666 | 23.78 |
|   | 19 | 66.17876 | 19.98271 |   |   |
|   | 20 | 58.61661 | 2.48025 | 1.58144 | 40.75 |
|   | 21 | −69.2056 | 10.61371 |   |   |
|   | 22 | −20.6695 | 1.3624 | 1.83481 | 42.72 |
|   | 23 | 295.4038 | 5.09813 |   |   |
|   | 24 | 429.6931 | 2.67387 | 1.6398 | 34.46 |
|   | 25 | −38.082 | Variable |   |   |

| | f | d5 | d10 |
|---|---|---|---|
| Wide-angle End | 56.9 | 2.76916 | 38.14877 |
| Middle Position | 160.8 | 39.59029 | 14.99915 |
| Telephoto End | 241.3 | 46.46256 | 1.271667 |

TABLE 1

| Conditional Expression | Embodiment 1 | Embodiment 2 | Embodiment 3 | Embodiment 4 |
|---|---|---|---|---|
| (1) | 0.71 | 0.74 | 0.87 | 0.84 |
| (2) | 0.098 | 0.111 | 0.095 | 0.094 |
| (3) | 0.43 | 0.47 | 0.39 | 0.39 |
| (4) | 0 | −0.002 | 0 | −0.020 |

Next, an embodiment in which a zoom lens of the present invention is used as a photographing optical system will be described with reference to FIG. 17. In FIG. 17, reference numeral 10 denotes a single-lens reflex camera main body, and reference numeral 11 denotes an interchangeable lens including a zoom lens according to the present invention.

Reference numeral 12 denotes a photosensitive surface, for example, a silver-halide film on which an object image obtained through the interchangeable lens 11 is recorded or a solid-state image pickup element (photoelectric conversion element) that detects an object image.

Reference numeral 13 denotes a finder optical system for observing an object image from the interchangeable lens 11. Reference numeral 14 denotes a movable quick return mirror for transmitting the object image from the interchangeable lens 11 to the photosensitive surface 12 or the finder optical system 13.

When the object image is to be observed through the finder, the object image formed on a focusing plate 15 through the quick return mirror 14 is converted into an erect image by a pentaprism 16 and is thereafter enlarged by and observed through an eyepiece 17.

At the time of photographing, the quick return mirror 14 moves in the direction of the arrow, and the object image is formed and recorded on the photosensitive surface 12.

By thus applying a zoom lens of the present invention to an optical apparatus such as a single-lens reflex camera interchangeable lens, an optical apparatus having high optical performance can be realized.

The present invention can also be applied to SLR (single-lens reflex) cameras having no quick return mirror.

The zoom lens of the present invention can also be applied to video cameras.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-307838 filed Nov. 14, 2006, which is hereby incorporated by reference herein in its entirety.

What is claimed is:

1. A zoom lens comprising in order from the object side to the image side:

a first lens unit having a positive refractive power;
a second lens unit having a negative refractive power; and
a third lens unit having a positive refractive power,
wherein the first lens unit and the third lens unit move in the optical axis direction during zooming, and
wherein the following conditions are satisfied:

$0.60 < m3/m1 < 0.90$, and $0.080 < |f2/ft| < 0.120$, where m1 and m3 are maximum moving distances in the optical axis direction of the first lens unit and the third lens unit, respectively, in zooming from a wide-angle end to a telephoto end, ft is a focal length of the zoom lens at the telephoto end, and f2 is a focal length of the second lens unit.

2. The zoom lens according to claim 1, wherein the following condition is satisfied:

$0.30 < |f1/ft| < 0.60$, where f1 is a focal length of the first lens unit L1.

3. The zoom lens according to claim 1, further comprising an aperture stop disposed on the object side of the third lens unit or in the third lens unit.

4. The zoom lens according to claim 1, wherein the second lens unit moves so as to have a component in a direction perpendicular to the optical axis direction so that an image is displaced in a direction perpendicular to the optical axis.

5. The zoom lens according to claim 1, further comprising a fourth lens unit disposed on the image side of the third lens unit, wherein the first, third, and fourth lens units move to the object side and the second lens unit does not move during zooming from the wide-angle end to the telephoto end.

6. The zoom lens according to claim 1, wherein the first and third lens units move to the object side and the second lens unit moves in a locus convex toward the image side during zooming from the wide-angle end to the telephoto end.

7. The zoom lens according to claim 6, wherein the following condition is satisfied:

$-0.150 < m2/m1 < 0.150$, where m2 is a maximum moving distance in the optical axis direction of the second lens unit during zooming from the wide-angle end to the telephoto end.

8. The zoom lens according to claim 1, wherein the zoom lens forms an image on a solid-state image pickup element.

9. An image pickup apparatus comprising the zoom lens according to claim 1 and a solid-state image pickup element that detects an image formed by the zoom lens.

* * * * *